(12) United States Patent
Okabayashi

(10) Patent No.: US 9,740,539 B2
(45) Date of Patent: Aug. 22, 2017

(54) INFORMATION PROCESSING DEVICE, ACTION SWITCHING METHOD AND RECORDING MEDIUM STORING SWITCHING PROGRAM

(71) Applicant: FUJITSU LIMITED, Kawasaki-shi, Kanagawa (JP)

(72) Inventor: Miwa Okabayashi, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 1 day.

(21) Appl. No.: 14/563,048

(22) Filed: Dec. 8, 2014

(65) Prior Publication Data
US 2015/0268994 A1 Sep. 24, 2015

(30) Foreign Application Priority Data
Mar. 20, 2014 (JP) .................................. 2014-058804

(51) Int. Cl.
G06F 9/46 (2006.01)
G06F 9/54 (2006.01)
G06F 9/48 (2006.01)

(52) U.S. Cl.
CPC ............ *G06F 9/542* (2013.01); *G06F 9/4843* (2013.01); *G06F 9/4881* (2013.01)

(58) Field of Classification Search
CPC ................................ G06F 9/4881; G06F 9/542
(Continued)

(56) References Cited

U.S. PATENT DOCUMENTS

| 5,012,409 A | * | 4/1991 | Fletcher | ................ | G06F 9/4887 |
| | | | | | 718/103 |
| 2002/0120943 A1 | * | 8/2002 | Seto | ........................ | H04H 20/62 |
| | | | | | 725/135 |

(Continued)

FOREIGN PATENT DOCUMENTS

| JP | 1-292539 | 11/1989 |
| JP | 2011-172180 | 9/2011 |

(Continued)

OTHER PUBLICATIONS

Nejad et al., A Software-based Technique Enabling Composable Hierarchical Preemtive Scheduling for Time-Triggered Applications,: 19th International Conference on Embedded and Real-Time Computing Systems and Applications, IEEE, Aug. 19-21, 2013.*

(Continued)

*Primary Examiner* — Wei Zhen
*Assistant Examiner* — Andrew M Lyons
(74) *Attorney, Agent, or Firm* — Staas & Halsey LLP

(57) ABSTRACT

An information processing device includes a processor; and a memory which stores a plurality of instructions, which when executed by the processor, cause the processor to execute: determining whether or not an action is executable based on a condition of a rule associated with the condition, the action, and a start priority; comparing a current priority that changes according to a state of an action in execution and an elapsed time since start of the state, with the start priority of the rule associated with the action determined to be executable; and instructing a management unit managing the execution of the actions to switch the action to be executed to the action of the rule associated with the start priority, based on the comparison result.

20 Claims, 29 Drawing Sheets

(58) Field of Classification Search
USPC .......................................................... 718/103
See application file for complete search history.

(56) References Cited

U.S. PATENT DOCUMENTS

| | | | | |
|---|---|---|---|---|
| 2003/0014467 | A1* | 1/2003 | Hanzawa | G06F 1/3228 718/102 |
| 2003/0070182 | A1* | 4/2003 | Pierre | H04N 5/76 725/135 |
| 2003/0110281 | A1* | 6/2003 | Minnick | H04L 49/90 709/232 |
| 2006/0171410 | A1* | 8/2006 | Jung | H04L 12/40143 370/447 |
| 2007/0004385 | A1* | 1/2007 | Horvitz | H04L 12/5855 455/414.1 |
| 2009/0031317 | A1* | 1/2009 | Gopalan | G06F 9/5033 718/103 |
| 2009/0055829 | A1* | 2/2009 | Gibson | G06F 9/4881 718/103 |
| 2009/0119330 | A1 | 5/2009 | Sampath et al. | |
| 2009/0125602 | A1* | 5/2009 | Bhatia | H04L 51/26 709/207 |
| 2009/0183162 | A1* | 7/2009 | Kindel | G06F 9/4843 718/103 |
| 2009/0271796 | A1* | 10/2009 | Kojima | G06F 9/4881 718/103 |
| 2009/0288090 | A1* | 11/2009 | Ujibashi | G06F 9/5011 718/103 |
| 2010/0107172 | A1* | 4/2010 | Calinescu | G06F 9/5061 718/104 |
| 2011/0246996 | A1* | 10/2011 | Tunning | G06F 9/4881 718/103 |
| 2012/0011035 | A1* | 1/2012 | Calcaterra | G06F 11/0709 705/34 |
| 2012/0246652 | A1* | 9/2012 | King-Smith | G06F 9/4843 718/102 |
| 2013/0042251 | A1* | 2/2013 | Nader | G06F 9/4881 718/103 |
| 2013/0346983 | A1* | 12/2013 | Kan | G06F 9/46 718/100 |
| 2014/0040905 | A1* | 2/2014 | Tsunoda | G06Q 10/06311 718/103 |
| 2014/0165216 | A1* | 6/2014 | Kwag | G06F 21/629 726/30 |
| 2014/0189684 | A1* | 7/2014 | Zaslavsky | G06F 9/45533 718/1 |

FOREIGN PATENT DOCUMENTS

| | | |
|---|---|---|
| JP | 2012-519547 | 8/2012 |
| WO | WO 2010/102069 | 9/2010 |

OTHER PUBLICATIONS

Tetzlaf et al., "Intelligent Prediction of Execution Times," Second International Conference on Informatics and Applications, IEEE, Sep. 23-25, 2013.*

Theys et al., "Scheduling Heuristics for Data Requests in an Oversubscribed Network with Priorities and Deadlines," 20th International Conference on Distributed Computing Systems, IEEE, Apr. 10-13, 2000.*

Xiong et al., "Relative Queue-based Distributed System Performance Real-Time Dynamic Monitor," IEEE International Conference on Granular Computing, IEEE, Aug. 17-19, 2009.*

* cited by examiner

FIG. 2

|   | E (EVENT) | C (CONDITION) | A (ACTION) | Ps (START PRIORITY) |
|---|---|---|---|---|
| (1) | LOCATION EVENT | LOCATION a | START APP 1 EXECUTION | 80 |
| (2) | LOCATION EVENT | LOCATION b | START APP 2 EXECUTION | 60 |
| (3) | TIME EVENT | TIME 12:30 | START APP 3 EXECUTION | 20 |
| (4) | TIME EVENT | TIME 15:30 | START APP 4 EXECUTION | 20 |
| | ⋮ | ⋮ | ⋮ | ⋮ |

FIG. 3

|     | E (EVENT) | C (CONDITION) | A (ACTION) | Ps (START PRIORITY) |
|-----|-----------|---------------|------------|---------------------|
| (1) | LOCATION EVENT | LOCATION a | START APP 1 EXECUTION | 80 |
| (4) | TIME EVENT | TIME 15:30 | START APP 3 EXECUTION | 20 |
|     | ⋮ | ⋮ | ⋮ | ⋮ |

FIG. 7

|  | E (EVENT) | C (CONDITION) | A (ACTION) | Ps (START PRIORITY) |
|---|---|---|---|---|
| (5) | LOCATION EVENT | LOCATION a | START APP 1 EXECUTION | 80 |
| (6) | TIME EVENT | TIME 12:30 | START APP 3 EXECUTION | 20 |
|  | ⋮ | ⋮ | ⋮ | ⋮ |

FIG. 9

| E (EVENT) | C (CONDITION) | A (ACTION) | Ps (START PRIORITY) | Ptmax | Ptmin |
|---|---|---|---|---|---|
| (7) LOCATION EVENT | LOCATION a | START APP 1 EXECUTION | 60 | 80 | 10 |
| (8) TIME EVENT | TIME 12:30 | START APP 3 EXECUTION | 30 | 60 | 0 |
| ... | ... | ... | ... | ... | ... |

FIG. 21

| | E (EVENT) | C (CONDITION) | A (ACTION) | Ps (START PRIORITY) | Ptmax | Ptmin |
|---|---|---|---|---|---|---|
| (9) | LOCATION EVENT | LOCATION a | START APP 1 EXECUTION | 60 | 80 | 20 |
| (10) | TIME EVENT | TIME 12:30 | START APP 2 EXECUTION | 55 | 60 | 20 |
| (11) | LOCATION EVENT | LOCATION b | START APP 3 EXECUTION | 60 | 80 | 10 |
| | ... | ... | ... | ... | ... | ... |

FIG. 25

| | E (EVENT) | C (CONDITION) | A (ACTION) | Ps (START PRIORITY) | Ptmax | Ptmin |
|---|---|---|---|---|---|---|
| (12) | LOCATION EVENT | LOCATION a | START APP 1 (a INTRODUCTION APP) EXECUTION | 60 | 80 | 20 |
| (13) | TIME EVENT | TIME 12:30 | START APP 2 (TIME SALE APP) EXECUTION | 55 | 60 | 0 |
| (14) | LOCATION EVENT | LOCATION b | START APP 3 (a INTRODUCTION APP) EXECUTION | 60 | 80 | 30 |

FIG. 27

|  | E (EVENT) | C (CONDITION) | A (ACTION) | Ps (START PRIORITY) |
|---|---|---|---|---|
| (COMPARISON 1) | LOCATION EVENT | LOCATION a | START APP 1 (a INTRODUCTION APP) EXECUTION | 60 |
| (COMPARISON 2) | TIME EVENT | TIME 12:30 | START APP 2 (TIME SALE APP) EXECUTION | 55 |
| (COMPARISON 3) | LOCATION EVENT | LOCATION b | START APP 3 (a INTRODUCTION APP) EXECUTION | 60 |

INFORMATION PROCESSING DEVICE, ACTION SWITCHING METHOD AND RECORDING MEDIUM STORING SWITCHING PROGRAM

CROSS-REFERENCE TO RELATED APPLICATION

This application is based upon and claims the benefit of priority of the prior Japanese Patent Application No. 2014-058804, filed on Mar. 20, 2014, the entire contents of which are incorporated herein by reference.

FIELD

The embodiments discussed herein are related to an information processing device, an action switching method and an action switching program.

BACKGROUND

Conventionally, execution of actions has been managed according to an ECA rule including a set of three elements, an event, a condition and an action. Also, as management of tasks similar to actions, execution of the tasks has been managed by multitasking.

In such management of the execution of the actions, there has been known a method for managing the execution based on the priority. There has also been known a method for managing the execution according to an elapsed time since the execution timing. Examples of documents disclosing such technologies include Japanese National Publication of International Patent Application No. 2012-519547, Japanese Laid-open Patent Publication Nos. 1-292539 and 2011-172180, and the like, for example.

SUMMARY

In accordance with an aspect of the embodiments, an information processing device includes a processor; and a memory which stores a plurality of instructions, which when executed by the processor, cause the processor to execute: determining whether or not an action is executable based on a condition of a rule associated with the condition, the action, and a start priority; comparing a current priority that changes according to a state of an action in execution and an elapsed time since start of the state, with the start priority of the rule associated with the action determined to be executable; and instructing a management unit managing the execution of the actions to switch the action to be executed to the action of the rule associated with the start priority, based on the comparison result.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which:

FIG. 2 is a diagram illustrating a specific example of rules according to the first embodiment;

FIG. 3 is a diagram illustrating a specific example of an execution waiting rule list;

FIG. 7 is a diagram illustrating a specific example of rules used for description of a change in a current priority Pt according to the first embodiment;

FIG. 9 is a diagram illustrating a specific example of rules according to a second embodiment;

FIG. 21 is a diagram illustrating a specific example of rules used for description of a change in a current priority Pt according to the third embodiment;

FIG. 25 is a diagram illustrating a specific example of rules according to a fifth embodiment;

FIG. 27 is a diagram illustrating a specific example of ECA rules according to a mobile terminal of a comparative example;

DESCRIPTION OF EMBODIMENTS

Hereinafter, an example of an embodiment is described with reference to the drawings. In this embodiment, description is given of an example where an information processing device is applied to a mobile terminal. Also, description is given of an example where ECA (event, condition, and action) rules to be described in detail later are employed as rules under which conditions and actions are associated with each other.

First Embodiment

Figure 1:
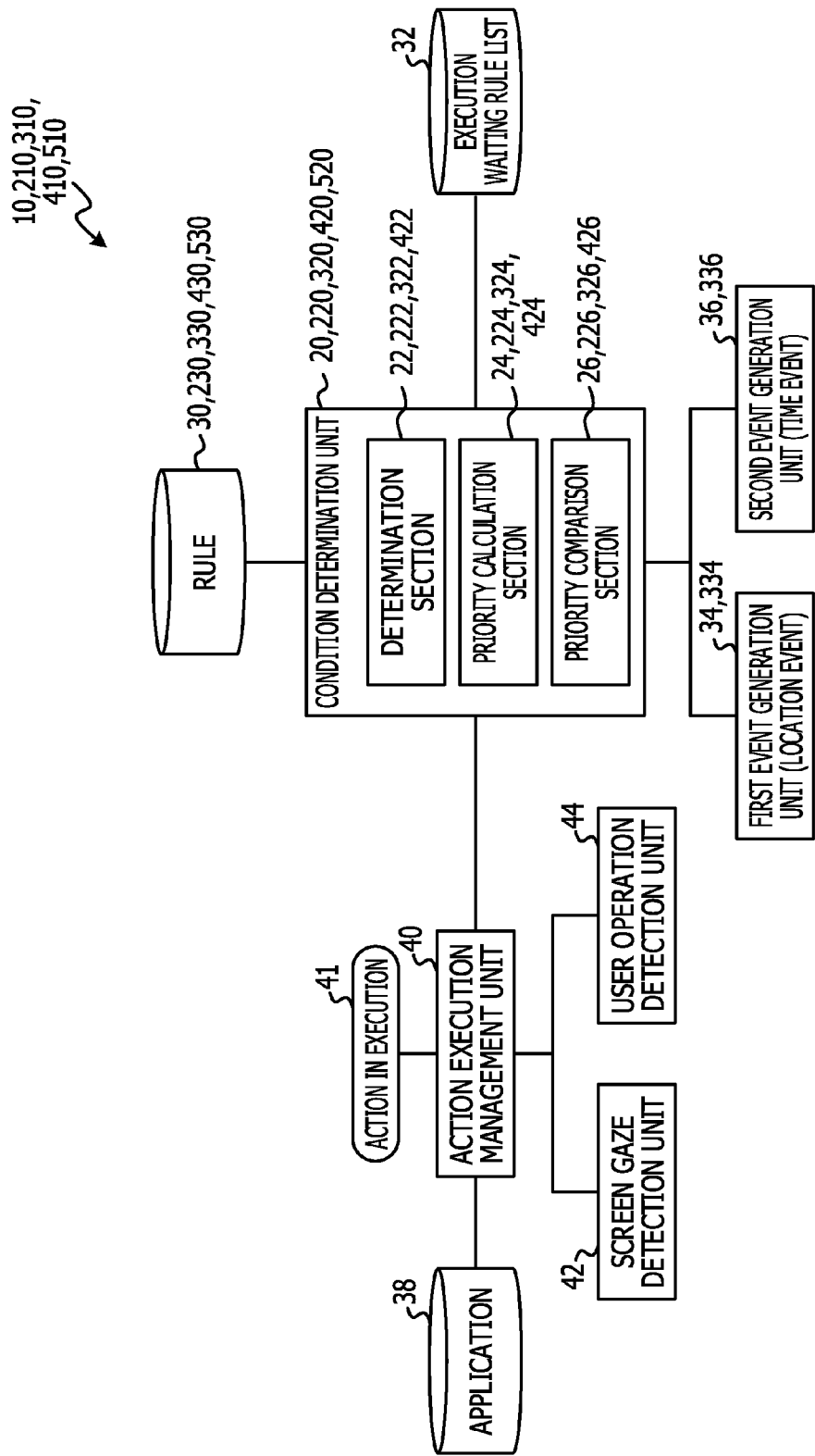
FIG. 1 is a functional block diagram illustrating a schematic configuration of a mobile terminal according to first to fifth embodiments.

FIG. 1 is a functional block diagram of a mobile terminal 10 according to this embodiment. Specific examples of the mobile terminal 10 include a smartphone, a tablet, and the like.

As illustrated in FIG. 1, the mobile terminal 10 according to this embodiment includes a condition determination unit 20, a first event generation unit 34, a second event generation unit 36, an action execution management unit 40, a screen gaze detection unit 42, and a user operation detection unit 44.

The condition determination unit 20 includes a determination section 22, a priority calculation section 24, and a priority comparison section 26.

The determination section 22 is an example of the determination unit in the disclosed technology. The determination section 22 determines whether or not an action may be executed by determining conditions based on rules 30. The rules 30 are ECA rules. The ECA rules are those under which three elements, that is, an event (Event), which is generation of an event and triggers determination, conditions (Condition) of the determination, and an action (Action) when the condition is met are associated with each other. Here, Event is referred to as an "event", Condition is referred to as "condition", and Action is referred to as an "action". Under the ECA rules, whether or not conditions are met is determined when an event is generated, and an action is executed when the condition is met.

FIG. 2 illustrates a specific example of the rules 30. Although FIG. 2 illustrates an example of four rules 30 (1) to (4), the number of the rules 30 is not limited. Also, under the rules 30 of this embodiment, a start priority Ps is further associated with the ECA.

Under the rule 30 (1), a location event as an event, location a as a condition, start of execution of application software 1 as an action, and 80 as a start priority Ps are associated with each other. Note that, hereinafter, the application software is referred to as an "application" and also as "app" when abbreviated. When the location event is generated, the determination section 22 determines whether or not the current location is location a, and determines that execution of the app 1 may be started when the current location is location a. Specific examples of the rule 30 (1) includes a case where, when (a user who uses) the mobile terminal 10 approaches location a in an exhibition hall, execution of the app 1 that displays description of exhibition contents is started.

Under the rule 30 (2), a location event as an event, location b as a condition, start of execution of app 2 as an action, and 60 as a start priority Ps are associated with each other. When the location event is generated, the determination section 22 determines whether or not the current location is location b, and determines that execution of the app 2 may be started when the current location is location b. Specific examples of the rule 30 (2) includes a case where, when it comes closer to the time of a scheduled demonstration, execution of the app 2 that displays description of the demonstration and notification of a location to carry out the demonstration is started.

Under the rule 30 (3), a time event as an event, time 12:30 as a condition, start of execution of app 3 as an action, and 20 as a start priority Ps are associated with each other. When the time event is generated, the determination section 22 determines whether or not the time is 12:30, and determines that execution of the app 3 may be started when the time is 12:30.

Under the rule 30 (4), a time event as an event, time 15:30 as a condition, start of execution of the app 3 as an action, and 20 as a start priority Ps are associated with each other. When the time event is generated, the determination section 22 determines whether or not the time is 15:30, and determines that execution of the app 3 may be started when the time is 15:30.

The determination section 22 writes the rules 30 including the actions determined to be executable in an execution waiting rule list 32. FIG. 3 illustrates a specific example of the execution waiting rule list 32. FIG. 3 illustrates, as a specific example, a case where the actions in the rules 30 (1) and (4) illustrated in FIG. 2 are determined to be executable by the determination section 22 and are written in the execution waiting rule list 32.

The priority calculation section 24 and the priority comparison section 26 are examples of the comparison unit in the disclosed technology. The priority in this embodiment includes two kinds, the start priority Ps described above and a current priority Pt. Note that, hereinafter, the start priority Ps and the current priority Pt are collectively referred to as the "priority". The priority takes a value within a range of 0 to 100.

The start priority Ps is a value indicating a priority of start of execution of the associated action. The start priority Ps is defined beforehand in the rule 30 as described above.

Meanwhile, the current priority Pt is a value indicating a priority of continuation of the execution of an action 41 in execution. The current priority Pt is a value that dynamically changes with a state of the action and elapsed time t' since the start of the state. In this embodiment, the state of the action indicates a state of user utilization of the app defined for the action. Moreover, in this embodiment, a state value s (0.0≤s≤1.0) is preset for each state of the action. As the state value s of a state becomes larger, the action 41 in execution is less likely to be switched to another action while the state is continuing.

Note that the "user" in this embodiment means a person who currently uses the mobile terminal 10, and does not mean a particular individual.

As a specific example of the state of the action, "gaze" and "operation" are described below. "Gaze" means a state where the user is presumed to be gazing at a display unit (see a display unit 66 in FIG. 4) in the mobile terminal 10. "Gaze" corresponds to a state where the user is looking at the display on the display unit, which is presented by an app executed according to an action, for example. In this embodiment, as a specific example, the state value s=0.5 is defined for "gaze".

Meanwhile, "operation" means a state where the user is operating the mobile terminal 10. "Operation" corresponds to a state where the user is operating an operation unit 68 to give some kind of instructions to an app executed according to an action. In this embodiment, as a specific example, the state value s=1.0 is defined for "operation".

In a priority calculation process (see a priority calculation process 74 in FIG. 4), the minimum value of the current priority Pt is defined beforehand for each state of the action. In this embodiment, s×Ps is set as the minimum value preset for each state of the action. Moreover, in this embodiment, the current priority Pt is attenuated by a value (λ×Ps) corresponding to a predetermined percentage λ (0<λ<1) of the start priority Ps, according to the elapsed time t'. However, the current priority Pt does not go below the minimum value defined for each state of the action.

Figure 4:
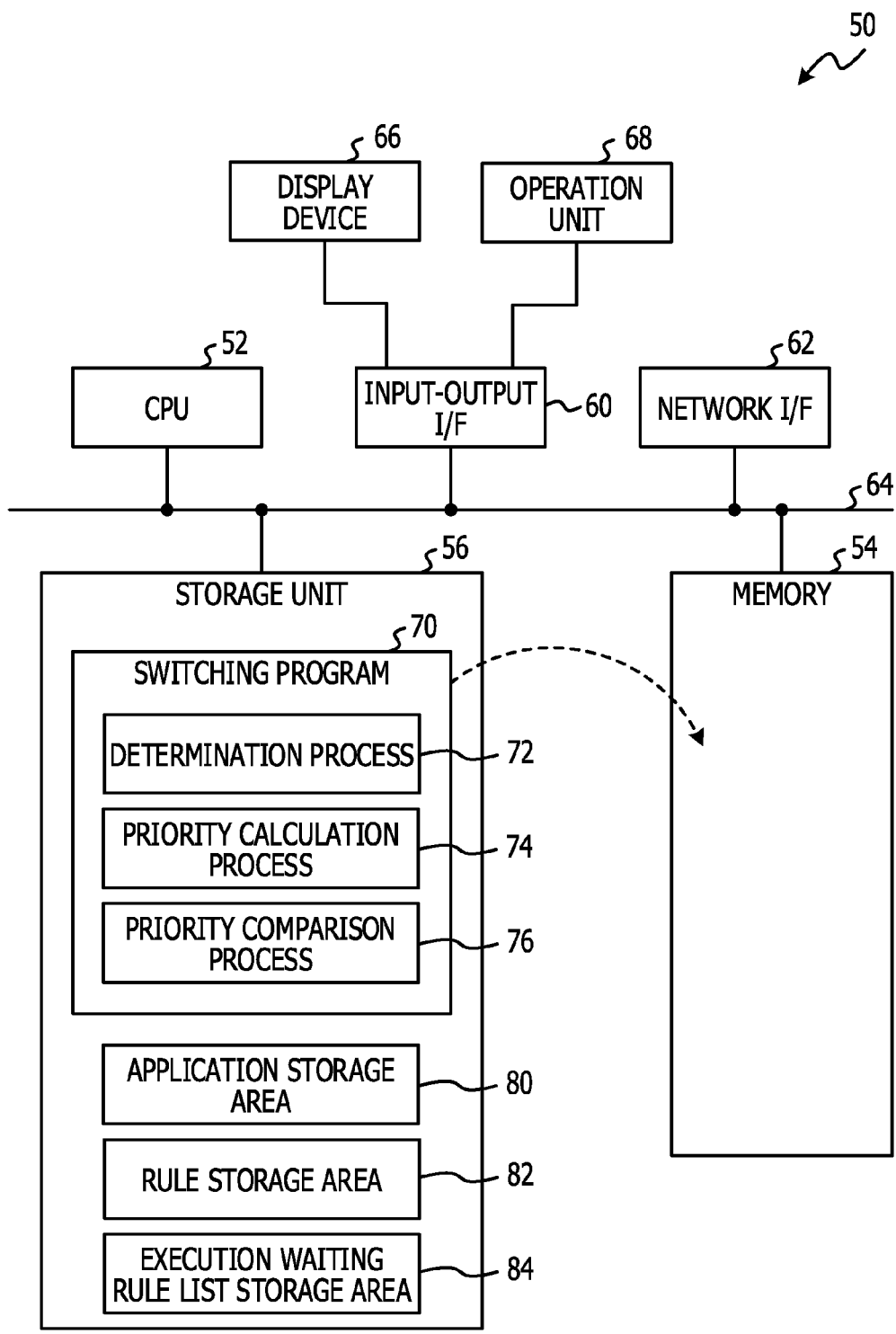
FIG. 4 is a block diagram illustrating a schematic configuration of a computer that functions as a condition determination unit and an action execution management unit in the mobile terminal.

The priority calculation section 24 has a function to calculate the current priority Pt based on a formula defined beforehand in the priority calculation process (see the priority calculation process 74 in FIG. 4).

The priority comparison section 26 has a function to compare the current priority Pt calculated by the priority calculation section 24 with the start priority Ps of the rule 30 written in the execution waiting rule list 32. When the start priority Ps exceeds the current priority Pt, the priority comparison section 26 instructs the action execution management unit 40 to switch from the action 41 in execution to an action associated with the start priority Ps.

The first event generation unit 34 has a function to generate a location event among events. The location event means an event generated when (the user who uses) the mobile terminal 10 enters or leaves a designated location, for example. The first event generation unit 34 has a sensing function to detect the location (position) of the mobile terminal 10. Examples of such a sensing function include a method using an access point of Global Positioning System (GPS) or Wireless Fidelity (WiFi: registered trademark), for example. The first event generation unit 34 generates a location event according to entrance into or exit from the designated location based on the detected location of the mobile terminal 10.

The second event generation unit 36 has a function to generate a time event among events. The time event is an event generated when the time reaches a specified time, for example. The second event generation unit 36 has a sensing function to detect the current time. Examples of such a sensing function include a method using an unillustrated clock function provided in the mobile terminal 10. The second event generation unit 36 generates a time event according to the specified time based on the detected current time.

Note that the kinds of the events are not limited to the location event and time event described in this embodiment. The kinds of the events include an event based on information of the real world where (the user who uses) the mobile terminal 10 exists, such as the location event and the time event, for example. Examples of such an event include an event generated when (the user who uses) the mobile terminal 10 rides on a vehicle, for example, and the like, besides the location event and the time event. Moreover, the kinds of the events include an event based on information of a world realized by a CPU (see a CPU 52 in FIG. 4) in the mobile terminal 10 executing various processes, for example. Examples of such an event include an event generated according to reception of a mail or change to and registration with a schedule system, and the like, for example. Note that, in order to respond to such various kinds of events, the mobile terminal 10 includes event generation units corresponding to the respective kinds and sensor functions corresponding to the respective kinds.

The action execution management unit 40 is an example of the management unit in the disclosed technology. The action execution management unit 40 has a function to manage the action 41 in execution. To be more specific, the action execution management unit 40 executes an action to execute an application 38 corresponding to the action. Also, the action execution management unit 40 either continues the execution of the action 41 in execution or switches to the action of the other rule 30, based on an instruction of the condition determination unit 20.

Moreover, the action execution management unit 40 has a function to detect the state of the action 41 in execution by using the screen gaze detection unit 42 and the user operation detection unit 44, and to provide the condition determination unit 20 with the state value s based on the result of the detection.

The screen gaze detection unit 42 has a function to detect whether or not the user is gazing at a screen of the display unit (see the display unit 66 in FIG. 4). As a specific example, the screen gaze detection unit 42 includes an unillustrated camera to photograph an area facing the screen, detects the face of a person from a photographed image, and detects gazing at the screen when detecting the face. The action execution management unit 40 detects that the state of the action is "gaze" when the screen gaze detection unit 42 detects the person gazing at the screen.

The user operation detection unit 44 has a function to detect whether or not a user operation is performed on the mobile terminal 10. As a specific example, the user operation detection unit 44 detects whether or not there is an input to an operation unit (see the operation unit 68 in FIG. 4) by a user operation. The action execution management unit 40 detects that the state of the action is "operation" when the user operation detection unit 44 detects a user operation.

The condition determination unit 20 in the mobile terminal 10 may be realized by a computer 50 illustrated in FIG. 4, for example. The computer 50 includes the central processing unit (CPU) 52, a memory 54, a nonvolatile storage unit 56, an input-output interface (I/F) 60, and a network I/F 62. The CPU 52, the memory 54, the storage unit 56, the input-output I/F 60 and the network I/F 62 are connected to each other through a bus 64. The input-output I/F 60 is connected to the display unit and the operation unit 68 included in the mobile terminal 10. The display unit 66 may be one having a screen. Specific examples of the display unit 66 include a display, a liquid-crystal display, a touch panel, and the like. Meanwhile, specific examples of the operation unit 68 include a touch panel, various keys, and the like.

The storage unit 56 may be realized by a hard disk drive (HDD), a flash memory, or the like. The storage unit 56 as a storage medium stores a switching program 70 for the computer 50 to function as the condition determination unit 20 in the mobile terminal 10. The CPU 52 reads the switching program 70 from the storage unit 56, develops the program in the memory 54, and sequentially executes processes included in the switching program 70.

The switching program 70 includes a determination process 72, the priority calculation process 74 and a priority comparison process 76. The CPU 52 operates as the determination section 22 illustrated in FIG. 1 by executing the determination process 72. The CPU 52 also operates as the priority calculation section 24 illustrated in FIG. 1 by executing the priority calculation process 74. The CPU 52 further operates as the priority comparison unit 26 illustrated in FIG. 1 by executing the priority comparison process 76.

An application storage area 80 in the storage unit 56 functions as a storage area to store the application 38 illustrated in FIG. 1. A rule storage area 82 in the storage unit 56 functions as a storage area to store the rules 30 illustrated in FIGS. 1 and 2. An execution waiting rule list storage area 84 in the storage unit 56 functions as a storage area to store the execution waiting rule list 32 illustrated in FIGS. 1 and 3.

Thus, the computer 50 executing the switching program 70 functions as the condition determination unit 20 in the mobile terminal 10.

Note that the condition determination unit 20 in the mobile terminal 10 may also be realized by a semiconductor integrated circuit, more specifically, an application specific integrated circuit (ASIC) or the like, for example.

Next, description is given of an operation performed by the condition determination unit 20 in the mobile terminal 10 according to this embodiment. When an event is generated by the first event generation unit 34 or the second event generation unit 36, the condition determination unit 20 in the mobile terminal 10 executes switching processing illustrated in FIG. 5 and issues an instruction about switching of the action 41 in execution.

Figure 5:
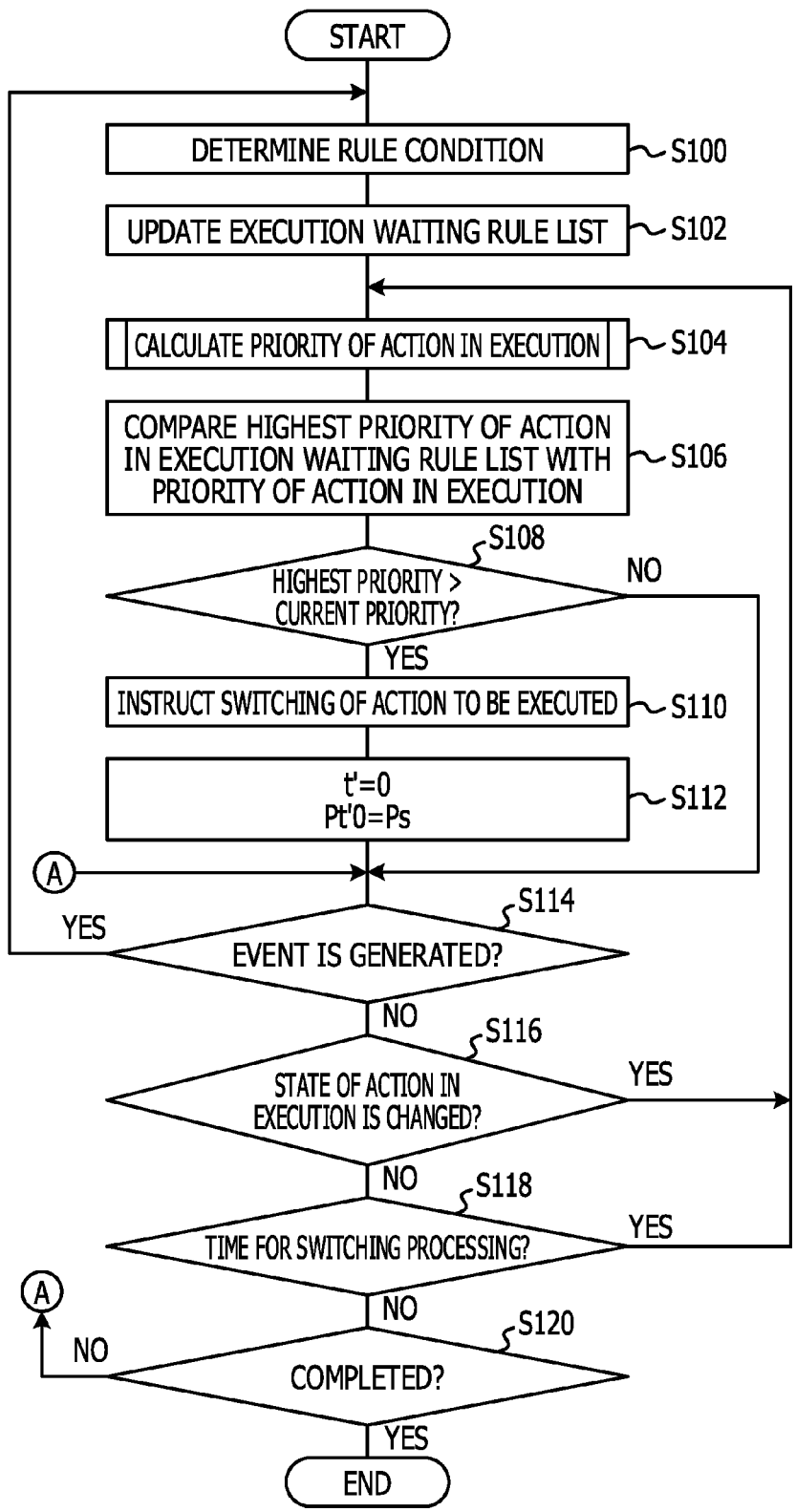
FIG. 5 is a flowchart illustrating an example of switching processing according to the first embodiment.

FIG. 5 is a flowchart illustrating an example of the switching processing according to this embodiment.

First, in Step S100 of the switching processing, the determination section 22 determines conditions of the rules 30. Next, in Step S102, the determination section 22 writes the rule 30 with the condition met in the execution waiting rule list 32. Note that, when it is determined in Step S100 that the condition is not met for the rule 30 written in the execution waiting rule list 32 by the previous determination, the rule 30 is deleted from the execution waiting rule list 32. The user may be notified of the rule 30 that is once written into the execution waiting rule list 32 and then deleted. A notification method and timing in such a case may be preset, and are not limited.

Figure 6:
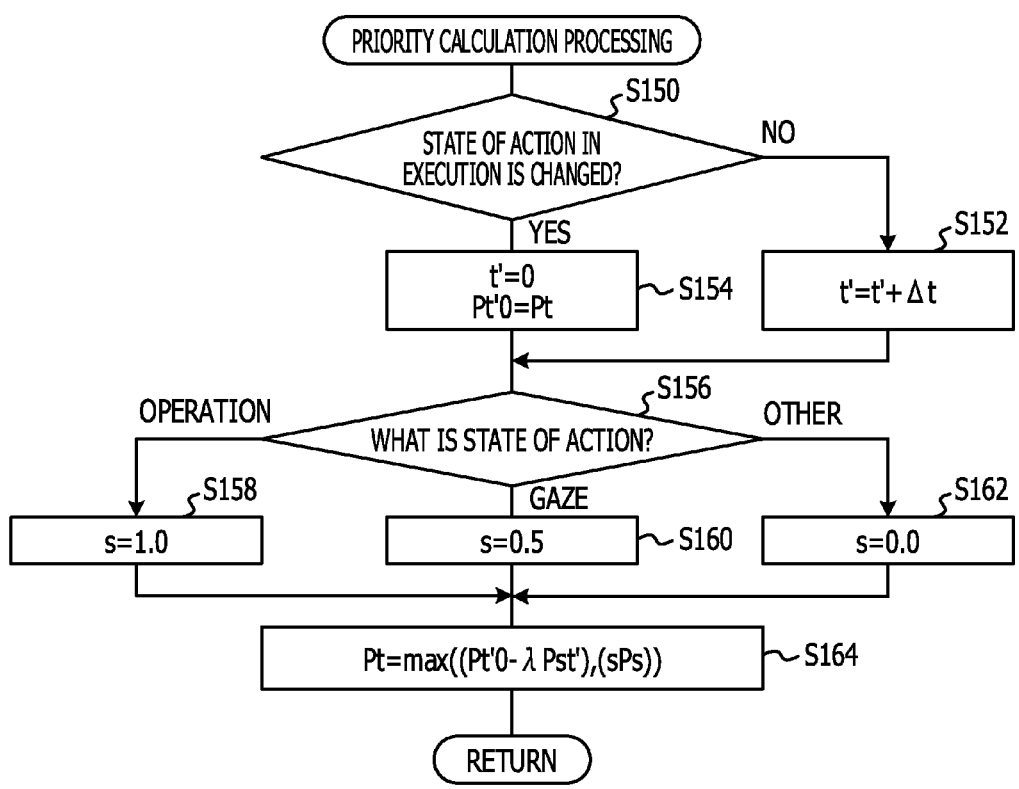
FIG. 6 is a flowchart illustrating an example of priority calculation processing according to the first embodiment.

Then, in Step S104, the priority calculation section 24 executes processing of calculating the priority of the action 41 in execution illustrated in FIG. 6. FIG. 6 is a flowchart illustrating an example of the priority calculation processing according to this embodiment. In Step S150 of the priority calculation processing illustrated in FIG. 6, the priority calculation section 24 determines whether or not the state of the action 41 in execution is changed, based on the result of the detection by the action execution management unit 40.

Note that, if there are two or more kinds of states as the state of the action 41 in execution, it is determined whether or not the state having a larger state value s is changed. For example, when the user carries out an operation while gazing at the mobile terminal 10, "gaze" and "operation" are detected as the state of the action 41 in execution. In this case, since "operation" has a larger state value s than "gaze", it is determined whether or not the "operation" state is changed. To be more specific, when the state is changed to "non-gaze" once the user looks away from the screen during "operation", it is determined that the state of the action 41 in execution is not changed from "operation". Likewise, when the state is changed from "non-gaze" to "gaze" as the user then faces the screen again, it is determined that the state of the action 41 in execution is not changed from "operation".

The processing moves to Step S152 when the state of the action 41 in execution is not changed, and moves to Step S154 when the state of the action 41 in execution is changed.

In Step S152, the priority calculation section 24 updates the elapsed time t' since the start of the state of the action 41 in execution by calculating the elapsed time t' using the following Equation (1). Note that, in the following Equation (1), Δt is an elapsed time since the execution of the previous priority calculation processing. In this embodiment, as a specific example, a value detected using an unillustrated timer (including a software timer) or the like is used as Δt.

$$t'=t'+\Delta t \quad \text{Equation (1)}$$

On the other hand, in Step S154, the priority calculation section 24 sets the elapsed time t'=0 and the current priority Pt'0 of the action 41 in execution when the elapsed time t'=0 o'clock=the current priority Pt. Note that, hereinafter, the current priority Pt'0 of the action 41 in execution when the elapsed time t'=0 o'clock is referred to as the "current priority Pt'0 at the start of the state".

Next, in Step S156, the priority calculation section 24 determines the kind of the state of the action 41 in execution based on the result of the detection by the action execution management unit 40. When the state of the action 41 in execution is "operation", the processing moves to Step S158. After the state value s=1.0 is acquired in Step S158, the processing moves to Step S164. On the other hand, when the state of the action 41 in execution is "gaze", the processing moves to Step S160. After the state value s=0.5 is acquired in Step S160, the processing moves to Step S164. Meanwhile, when the state of the action 41 in execution is "other", the processing moves to Step S162. After the state value s=0.0 is acquired in Step S162, the processing moves to Step S164. Note that "other" means that the state of the action 41 in execution is neither "gaze" nor "operation".

In Step S164, the priority calculation section 24 uses the following Equation (2) to calculate the current priority Pt of the action 41 in execution, and then moves to Step S106. Note that, in the following Equation (2), λ is the predetermined percentage described above, which is 0<λ<1. The predetermined percentage λ is a fixed value defined beforehand in the priority calculation process 74. Also, in the following Equation (2), max ((A), (B)) means that A or B with a larger value is to be adopted.

$$Pt=\max((Pt'0-\lambda \times Ps \times t'),(s \times Ps)) \quad (2)$$

The priority calculation section 24 attenuates the current priority Pt corresponding to the elapsed time t' since the start of the state of the action 41 in execution by a value corresponding to the predetermined percentage λ of the start priority Ps according to the elapsed time t' from the current priority Pt'0 at the start of the state as described above. Therefore, the current priority Pt corresponding to the elapsed time t' since the start of the state of the action 41 in execution is calculated by Pt'0−λ×Ps×t'. Note that, hereinafter, the current priority Pt corresponding to the elapsed time t' since the start of the state of the action 41 in execution is referred to as the "current priority Pt corresponding to the elapsed time".

Moreover, the priority calculation section 24 obtains the current priority Pt based on the state of the action 41 in execution by calculating s×Ps. The current priority Pt based on the state of the action 41 in execution, which is calculated here, corresponds to the minimum value set beforehand for each state of the action as described above. Note that, hereinafter, the current priority Pt based on the state of the action 41 in execution is referred to as the "current priority Pt based on the state".

Furthermore, the priority calculation section 24 adopts either one of the calculated current priority Pt corresponding to the elapsed time and current priority Pt based on the state, the one with a larger value as the current priority Pt of the action 41 in execution.

In Step S106, the priority comparison section 26 compares the start priority with the highest value, among the start priorities Ps of the rules 30 written in the execution waiting rule list 32, with the current priority Pt calculated by the processing in Step S104. When the actions of the rules 30 written in the execution waiting rule list 32 are to be executed, even if a number of rules 30 are written therein, the rule 30 with the start priority Ps having the highest value is to be executed. Therefore, the priority comparison section 26 compares the highest start priority Ps with the current priority Pt.

Next, in Step S108, the priority comparison section 26 determines whether or not the highest start priority Ps>the current priority Pt is true. When the highest start priority Ps>the current priority Pt is not true (when the highest start priority Ps≤the current priority Pt), the processing moves to Step S114. On the other hand, when the highest start priority Ps>the current priority Pt, the processing moves to Step S110.

In Step S110, the priority comparison section 26 instructs the action execution management unit 40 to switch the action 41 in execution to the action of the rule 30 associated with the highest start priority Ps. In response to the instruction of the priority comparison section 26, the action execution management unit 40 switches the action 41 in execution to the action of the rule 30 associated with the highest start priority Ps.

Next, in Step S112, the priority comparison section 26 sets the elapsed time t'=0 and the current priority Pt'0 at the start of the state=the start priority Ps. Note that although the current priority Pt'0 at the start of the state=the start priority Ps is set here, the current priority Pt'0 at the start of the state may be set to another value. The current priority Pt'0 at the start of the state may be set to a value larger than the start priority Ps, in order to reduce switching to the action of another rule 30 immediately after switching, for example.

Then, in Step S114, the determination section 22 determines whether or not an event is generated by the first event generation unit 34 or the second event generation unit 36. When the event is generated, the processing returns to Step S100 to repeat the processing described above. On the other hand, when no event is generated, the processing moves to Step S116.

In Step S116, the determination section 22 determines whether or not the state of the action 41 in execution is changed, based on the result of the detection by the action execution management unit 40. When the state of the action 41 in execution is changed, the processing returns to Step S104 to repeat the processing described above. On the other hand, when the state of the action 41 in execution is not changed, the processing moves to Step S118.

In Step S118, the determination section 22 determines whether or not it is time to perform the switching processing. The mobile terminal 10 according to this embodiment is preset to periodically perform the switching processing, as an example. Thus, the determination section 22 determines whether or not it is time to perform the switching processing. When it is time to perform the switching processing, the processing returns to Step S104 to repeat the processing described above. On the other hand, when it is not time to perform the switching processing, the processing moves to Step S120.

In Step S120, the determination section 22 determines whether to terminate the switching processing. When predetermined termination conditions are met, such as when the action 41 in execution is completed and when the power of the mobile terminal 10 is turned off, for example, the determination section 22 determines to terminate the switching processing. Then, the switching processing is terminated. On the other hand, when the termination conditions described above are not met, or the like, the determination section 22 determines not to terminate the switching processing, and then returns to Step S114 to repeat the processing described above.

Next, description is given of switching of the action 41 in execution by the switching processing according to this embodiment by giving a specific example. FIG. 7 illustrates a specific example of the rules 30 used for the following description. Here, as illustrated in FIG. 7, two rules 30, (5) and (6), are defined as a specific example. Also, the rule 30 (5) is in execution, and the action of the rule 30 corresponds to the action 41 in execution.

Figure 8:
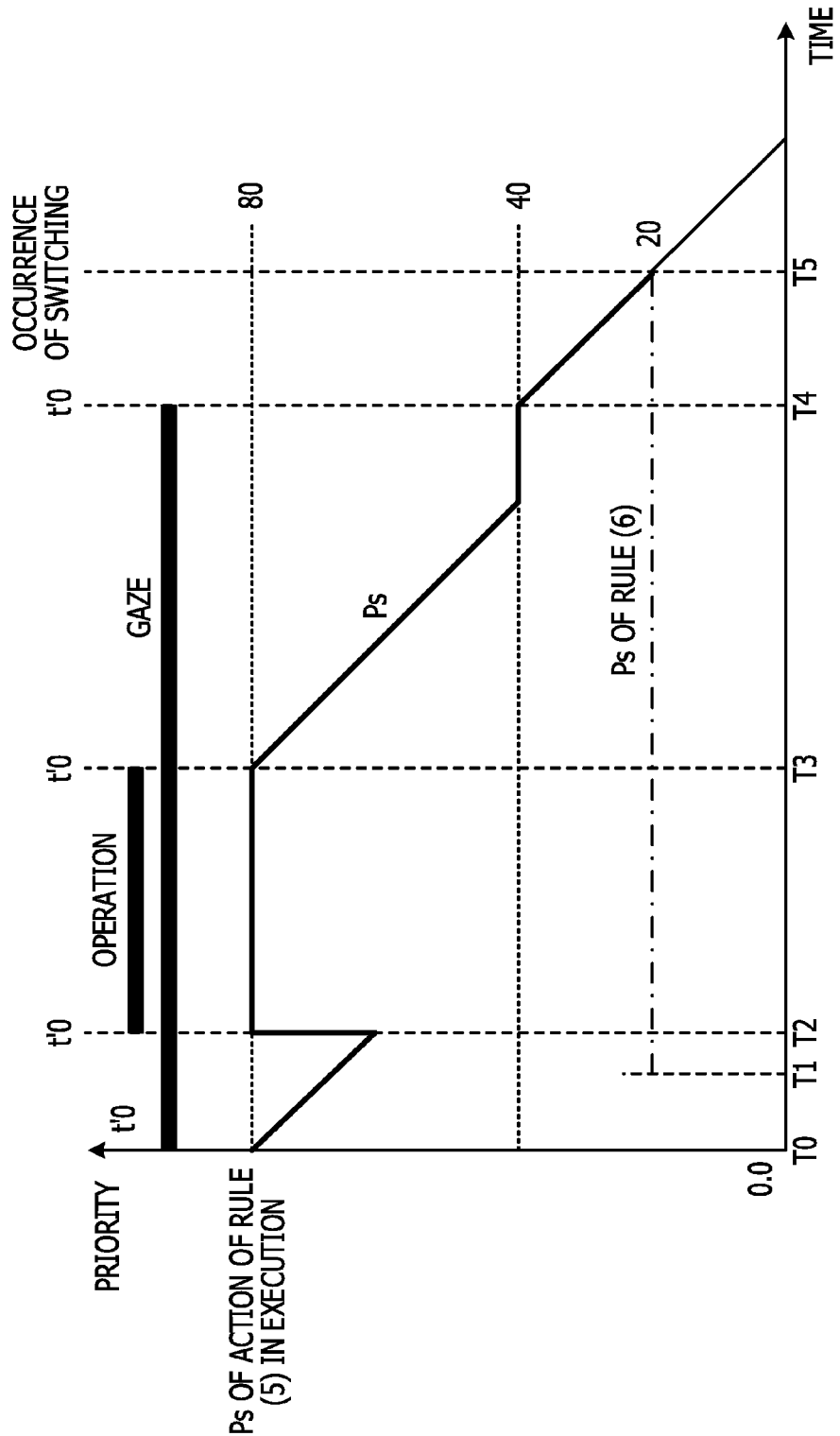
FIG. 8 is a diagram for explaining a change in the current priority Pt of an action in execution according to the first embodiment.

FIG. 8 illustrates a specific example used for description of a change in the current priority Pt of the action 41 in execution. In the rule 30 (5), when the state of the action is "gaze", the minimum value preset for each state of the action is s×Ps=0.5×80=40. On the other hand, when the state of the action is "operation", the minimum value preset for each state of the action is s×Ps=1.0×80=80. Meanwhile, when the state of the action is "other", the minimum value preset for each state of the action is s×Ps=0.0×80=0.

As illustrated in FIG. 8, at the time T0, the current priority Pt of the action 41 in execution=the start priority Ps=80. Although the state of the action 41 in execution is "gaze" at the time T0, the current priority Pt=80>40. Thus, the current priority Pt is gradually attenuated according to the elapsed time t'.

The determination section 22 repeats the determination of the conditions of the rules 30 during the switching processing as described above. FIG. 8 illustrates the case where the condition of the rule 30 (6) is met at the time T1 and written in the execution waiting rule list 32. The rule 30 (6) has the start priority Ps=20, which is not more than the current priority Pt of the action 41 in execution at the time T1. Thus, no switching of the action 41 in execution occurs.

When the state of the action 41 in execution is changed to "operation" at the time T2, the current priority Pt jumps straight to 80 since the minimum value of "operation"=80. During the "operation" state, the current priority Pt stays at 80.

When the state of the action 41 in execution is changed to "gaze" at the time T3, the current priority Pt starts being attenuated according to the elapsed time t', and then stays unchanged after reaching the minimum value of "gaze"=40.

When the state of the action 41 in execution is changed to "other" at the time T4, the current priority Pt starts being attenuated according to the elapsed time t'. When the current priority Pt<the start priority Ps of the rule 30 (6) is satisfied at the time T5, the action 41 in execution is switched to the action of the rule 30 (6).

As described above, in the mobile terminal 10 according to this embodiment, the start priority Ps is associated beforehand for each of the rules 30 which are the ECA rules. The determination section 22 in the condition determination unit 20 writes the rule 30 with the condition met in the execution waiting rule list 32. The priority calculation section 24 in the condition determination unit 20 calculates the current priority Pt according to the state of the action 41 in execution. For the current priority Pt, the minimum value is preset for each state of the action. Also, the current priority Pt is attenuated according to the elapsed time t'. Furthermore, the priority comparison section 26 in the condition determination unit 20 compares the highest start priority Ps with the current priority Pt calculated by the priority calculation section 24, among the rules 30 in the execution waiting rule list 32. When the highest start priority Ps>the current priority Pt is satisfied, the priority comparison section 26 switches the action 41 in execution to the action of the rule 30 associated with the highest start priority Ps. More specifically, the current priority Pt of the action 41 in execution is changed according to the state of the action and the elapsed time t' since the start of the state. Thus, switching of the action 41 in execution is reduced. The state of the action 41 in execution corresponds to the user utilization state. Therefore, by setting a larger value as the minimum value for each state of the action for the state where switching of the action 41 in execution is assumed to be not desired by the user, switching of the action 41 in execution during use may be reduced.

Moreover, in the mobile terminal 10, when the action 41 in execution is desirably switched regardless of the user utilization state, the rules 30 may be defined while associating the start priority Ps having a large value (for example, the maximum assignable value) with the action to be desirably switched. There is a case where it is not desirable to leave confidential information displayed on the display unit 66 in the mobile terminal 10, such as when the user leaves a conference room or leaves his/her office, for example. In such a case, it is possible to switch to an action of not displaying the action 41 in execution or displaying information that is not confidential.

Furthermore, in the mobile terminal 10 according to this embodiment, the start priority Ps is associated with the rules 30, which are the ECA rules, and the current priority Pt of the action 41 in execution is obtained by calculation. Thus, the priority may be easily set and changed. For example, the priority does not have to be defined as a fixed value in an app to be executed by the action.

When attempting to switch an action in execution in the conventional mobile terminal, there may be a case where conditions of the ECA rules have to be set in consideration of the action of another ECA rule. In such a case, when providing a new ECA rule in the conventional mobile terminal, the conditions have to be reviewed also for the other existing ECA rules. On the other hand, in the mobile terminal 10 according to this embodiment, since the current priority Pt is dynamically changed, switching of the action 41 in execution may be reduced without setting conditions in consideration of the action of another rule 30. Thus, complicated condition setting may be reduced. Moreover, since the existing rules 30 do not have to be reviewed, new rules 30 may be easily added.

Note that when there is no action 41 in execution in the switching processing described above, the processing of Steps S104 to S108 of the switching processing may be omitted. Moreover, in Step S110, the priority comparison section 26 may instruct the action execution management unit 40 to execute the rule 30 associated with the highest start priority Ps among those in the execution waiting rule list 32. Furthermore, when there is no action 41 in execution, processing of executing the highest start priority Ps in the execution waiting rule list 32 may be performed aside from the switching processing described above.

Second Embodiment

Next, a second embodiment is described. Note that the same components as those in the mobile terminal 10 according to the first embodiment are denoted by the same reference numerals, and detailed description thereof is omitted. In this embodiment, description is given of a case where a maximum value Ptmax and a minimum value Ptmin of an action are associated with ECA rules, in addition to the start priority Ps.

FIG. 9 illustrates a specific example of rules 230 which are the ECA rules according to this embodiment. As illustrated in FIG. 9, the maximum value Ptmax and the minimum value Ptmin of the current priority Pt are associated with each of the rules 230. The current priority Pt dynamically changes within a range of the minimum value Ptmin to the maximum value Ptmax.

Note that, although the start priority Ps<the maximum value Ptmax in the specific example illustrated in FIG. 9, the start priority Ps≥the maximum value Ptmax may be established. Also, although the start priority Ps>the minimum value Ptmin in the specific example illustrated in FIG. 9, the start priority Ps≤the minimum value Ptmin may be established.

As illustrated in FIG. 1, a mobile terminal 210 according to the second embodiment includes a condition determination unit 220, a first event generation unit 34, a second event generation unit 36, an action execution management unit 40, a screen gaze detection unit 42, and a user operation detection unit 44.

The condition determination unit 220 includes a determination section 222, a priority calculation section 224, and a priority comparison section 226.

The determination section 222 determines whether or not an action may be executed by determining conditions based on the rules 230, as in the case of the determination section 22 in the first embodiment.

The priority calculation section 224 calculates the current priority Pt. However, a calculation method is different from that in the first embodiment, since the current priority Pt dynamically changes with the range of the minimum value Ptmin to the maximum value Ptmax.

As in the case of the priority comparison section 26 in the first embodiment, the priority comparison section 226 compares the current priority Pt with the highest start priority Ps, and instructs switching of the action 41 in execution when the highest start priority Ps has a larger value. Note that how the priority comparison section 226 sets the current priority Pt'0 at the start of the state when the switched action is started is different from the case of the priority comparison section 26 in the first embodiment.

Next, description is given of an operation performed by the condition determination unit 220 in the mobile terminal 210 according to this embodiment.

Figure 10:
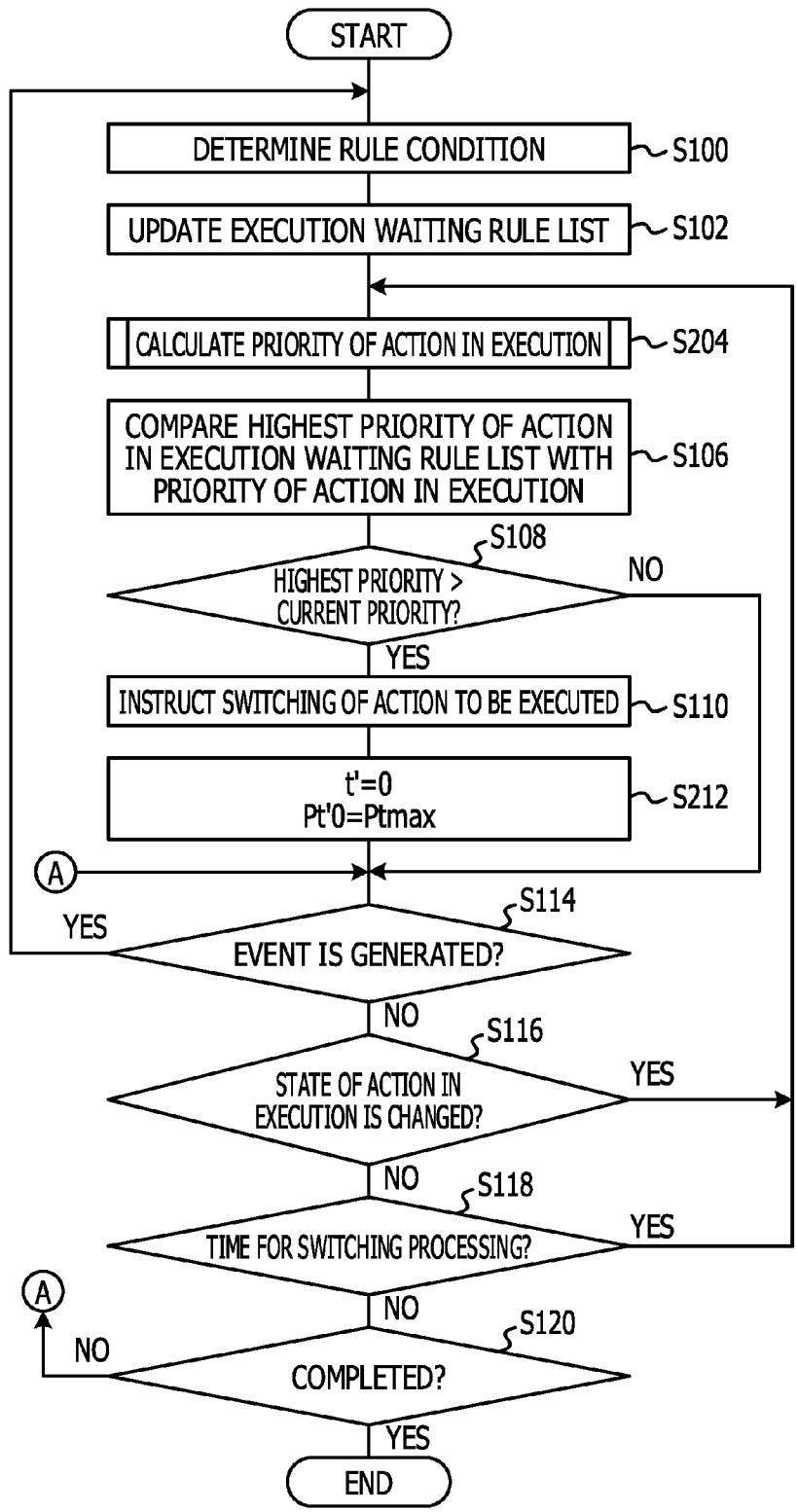
FIG. 10 is a flowchart illustrating an example of switching processing according to the second embodiment.

FIG. 10 is a flowchart illustrating an example of switching processing according to this embodiment. Note that the same processing steps as those in the switching processing according to the first embodiment are denoted by the same reference numerals, and detailed description thereof is omitted.

In Steps S100 and S102, the determination section 222 determines the conditions of the rules 230, and writes the rule 230 with the condition met in the execution waiting rule list 32.

Figure 11:
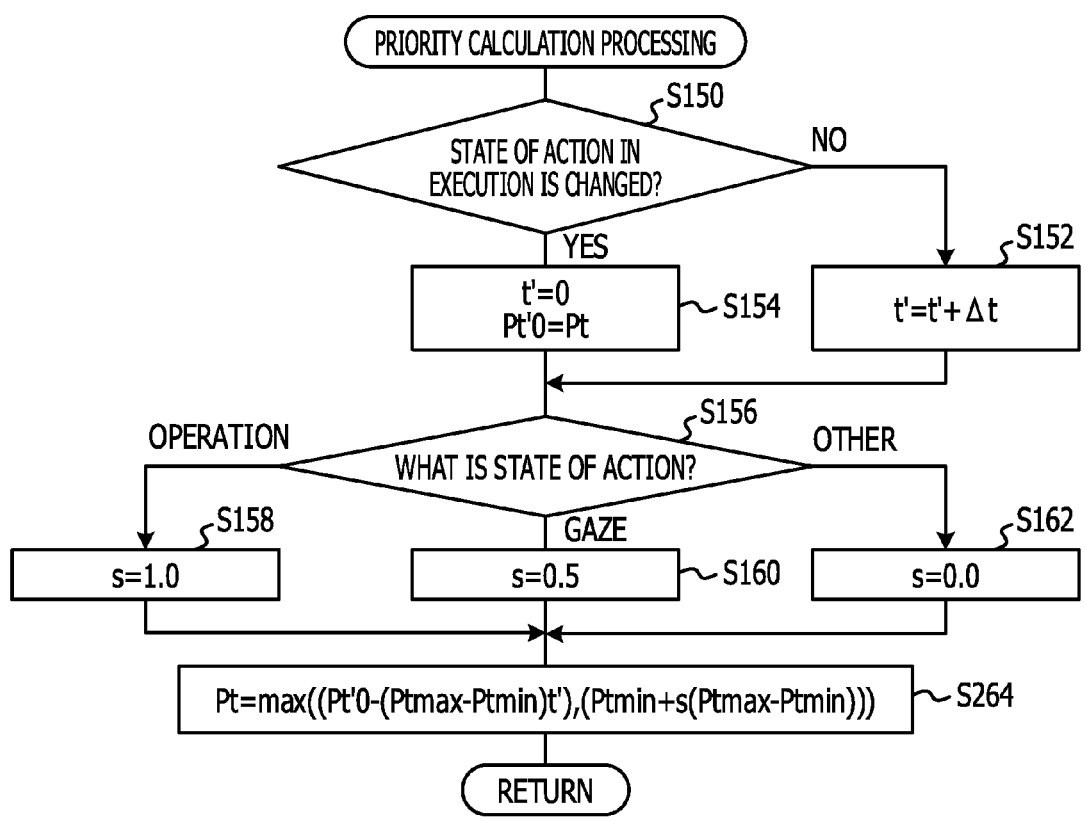
FIG. 11 is a flowchart illustrating an example of priority calculation processing according to the second embodiment.

Next, in Step S204, the priority calculation section 224 executes priority calculation processing of the action 41 in execution illustrated in FIG. 11. FIG. 11 is a flowchart illustrating an example of the priority calculation processing according to this embodiment. In Steps S150 to S162 of the priority calculation processing illustrated in FIG. 11, the priority calculation section 224 determines whether or not the state of the action 41 in execution is changed, based on the result of the detection by the action execution management unit 40.

When the state of the action 41 in execution is not changed, the priority calculation section 224 updates the elapsed time t' since the start by using Equation (1) described above in the first embodiment. On the other hand, when the state of the action 41 in execution is changed, the priority calculation section 224 sets the elapsed time t'=0 and the current priority Pt'0 at the start of the state=the current priority Pt.

Then, the priority calculation section 224 determines the kind of the state of the action 41 in execution. The state value s=1.0 is acquired when the state of the action 41 in execution is "operation". The state value s=0.5 is acquired when the state is "gaze". The state value s=0.0 is acquired when the state is "other".

Next, in Step S264, after the priority calculation section 224 calculates the current priority Pt of the action 41 in execution by calculating the following Equation (3), the processing moves to Step S106. Note that, in the following Equation (3), max ((A), (B)) means that A or B with a larger value is to be adopted.

$$Pt=\max((Pt'0-\lambda \times (Pt\max-Pt\min) \times t'),(Pt\min+s \times (Pt\max-Pt\min))) \quad (3)$$

Since the current priority Pt according to the elapsed time is attenuated according to the elapsed time t' from the current priority Pt'0 at the start of the state, the priority calculation section 24 calculates Pt'0−λ×(Ptmax−Ptmin)×t.

Moreover, the priority calculation section 24 obtains the current priority Pt based on the state by calculating Ptmin+s×(Ptmax−Ptmin). The current priority Pt based on the state calculated here corresponds to the minimum value set beforehand for each state of the action.

Furthermore, the priority calculation section 24 adopts either one of the calculated current priority Pt corresponding to the elapsed time and current priority Pt based on the state, the one with a larger value as the current priority Pt of the action 41 in execution.

In Steps S106 to S110, the priority comparison section 26 compares the start priority with the highest value, among the start priorities Ps of the rules 30 written in the execution waiting rule list 32, with the current priority Pt calculated by the processing in Step S104. Then, the priority comparison section 26 determines whether or not the highest start priority Ps>the current priority Pt is true. When the highest start priority Ps>the current priority Pt is not true, the processing moves to Step S114. On the other hand, when the highest start priority Ps>the current priority Pt, the priority comparison section 26 instructs the action execution management unit 40 to switch the action 41 in execution.

Next, in Step S212, the priority comparison section 26 sets the elapsed time t'=0 and the current priority Pt'0 at the start of the state=the maximum value Ptmax. Such setting enables reduction in switching to the action of another rule 30 immediately after switching of the action 41 in execution.

Next, in Steps S114 to S120, the condition determination unit 220 determines whether or not an event is generated, the state of the action 41 in execution is changed, it is time to perform the switching processing and termination conditions are met. Thus, the switching processing is repeated or terminated.

Next, description is given of switching of the action 41 in execution by the switching processing according to this embodiment by giving a specific example. Here, as a specific example, the action of the rule 230 (7) illustrated in FIG. 9 corresponds to the action 41 in execution.

Figure 12:
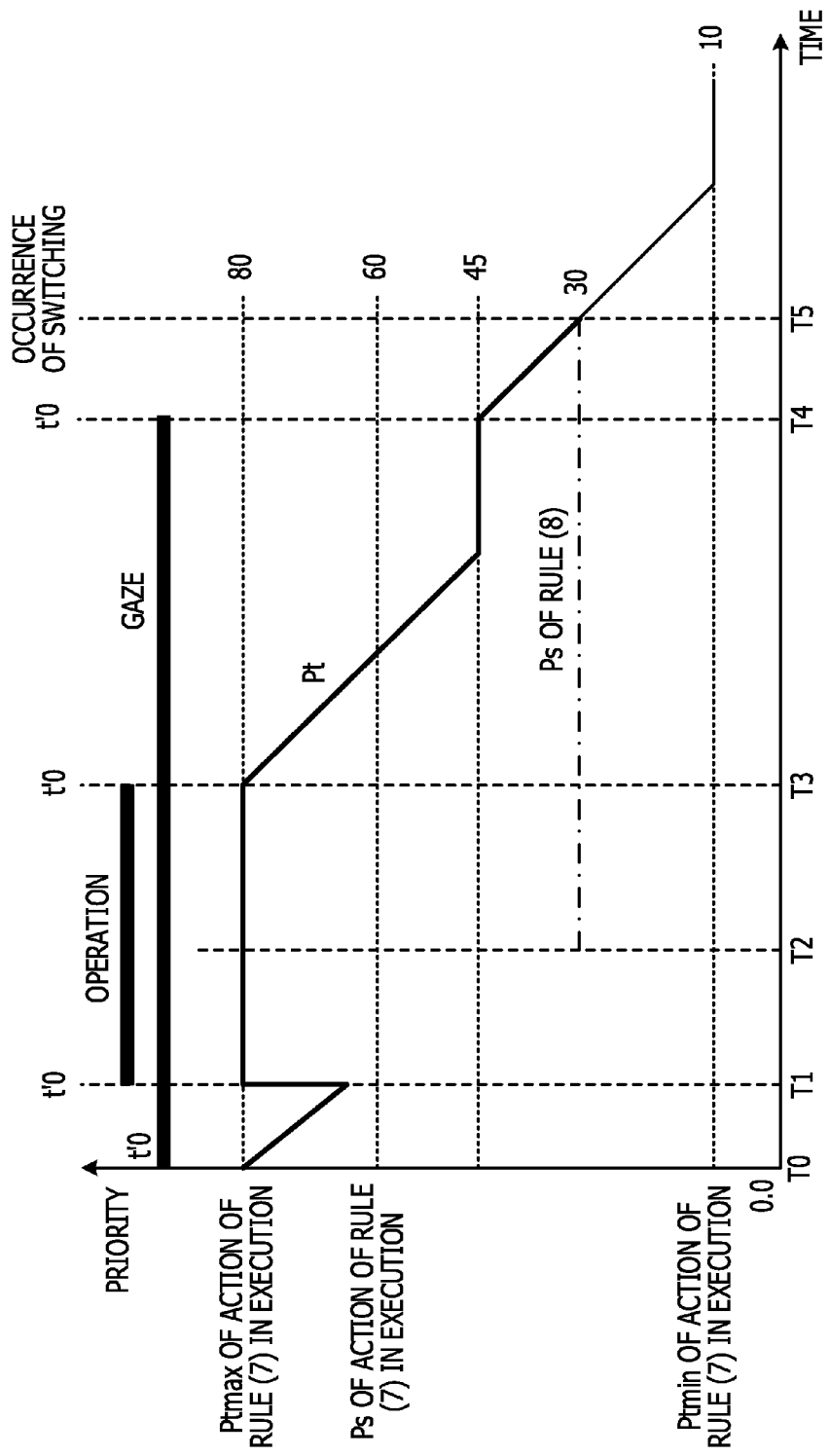
FIG. 12 is a diagram for explaining a change in a current priority Pt of an action in execution according to the second embodiment.

FIG. 12 illustrates a specific example used for description of a change in the current priority Pt of the action 41 in execution. In the rule 230 (7), when the state of the action is "gaze", the minimum value preset for each state of the action is Ptmin+s×(Ptmax−Ptmin)=10+0.5×(80−10)=45. On the other hand, when the state of the action is "operation", the minimum value preset for each state of the action is Ptmin+s×(Ptmax−Ptmin)=10+1.0×(80−10)=80. Meanwhile, when the state of the action is "other", the minimum value preset for each state of the action is Ptmin+s×(Ptmax−Ptmin)=10+0.0×(80−10)=10.

As illustrated in FIG. 12, at the time T0, the current priority Pt of the action 41 in execution=the maximum value Ptmax=80. Although the state of the action 41 in execution is "gaze" at the time T0, the current priority Pt=80>45. Thus, the current priority Pt is gradually attenuated according to the elapsed time t'.

When the state of the action 41 in execution is changed to "operation" at the time T1, the current priority Pt jumps straight to 80 since the minimum value of "operation"=80. During the "operation" state, the current priority Pt stays at 80.

The determination section 222 repeats the determination of the conditions of the rules 230 during the switching processing as described above. FIG. 12 illustrates the case where the condition of the rule 230 (8) is met at the time T2 and written in the execution waiting rule list 32. The rule 230 (8) has the start priority Ps=30, which is not more than the current priority Pt of the action 41 in execution at the time T2. Thus, no switching of the action 41 in execution occurs.

When the state of the action 41 in execution is changed to "gaze" at the time T3, the current priority Pt starts being attenuated according to the elapsed time t', and then stays unchanged after reaching the minimum value of "gaze"=45.

When the state of the action 41 in execution is changed to "other" at the time T4, the current priority Pt starts being attenuated according to the elapsed time t'. When the current priority Pt<the start priority Ps of the rule 230 (8) is satisfied at the time T5, the action 41 in execution is switched to the action of the rule 230 (8).

As described above, in the mobile terminal 210 according to this embodiment, the start priority Ps and the maximum value Ptmax and the minimum value Ptmin of the current priority Pt are associated beforehand for each of the rules 30 which are the ECA rules. The priority calculation section 224 calculates the current priority Pt that dynamically changes within a range of the minimum value Ptmin to the maximum value Ptmax. Therefore, the same effects as those achieved in the first embodiment are achieved.

Moreover, the condition determination unit 220 according to this embodiment sets a large value as the minimum value Ptmin, compared with the other rules 230. Thus, switching may be reduced regardless of the state of the action 41 in execution. Furthermore, by setting large values as the maximum value Ptmax and the minimum value Ptmin compared with the other rules 230, the mobile terminal 210 of this embodiment may further reduce switching of the action 41 in execution compared with the mobile terminal 10 of the first embodiment.

Third Embodiment

Next, a third embodiment is described. Note that the same components as those in the mobile terminals 10 and 210 according to the above embodiments are denoted by the same reference numerals, and detailed description thereof is omitted. In this embodiment, description is given of a case where likelihood L of conditions according to a sensing function, the kind of an event, and the like is reflected on the start priority Ps.

As illustrated in FIG. 1, a mobile terminal 310 according to the third embodiment includes a condition determination unit 320, a first event generation unit 334, a second event generation unit 336, an action execution management unit 40, a screen gaze detection unit 42, and a user operation detection unit 44.

The first event generation unit 334 and the second event generation unit 336 have various sensing functions as described above. In the case of sensing, a probability value (likelihood) exists, which is not binarized by 0, 1 and the like. Generally, in the case of using such a sensing function, an event is generated when the probability value exceeds a threshold value.

The first event generation unit 334 and the second event generation unit 336 according to this embodiment reflect the likelihood L according to the sensing function on the start priority Ps. The likelihood L takes a value $0 \leq L \leq 1$.

In the case of a location event such as those generated by the first event generation unit 334, the likelihood L represents a probability of (a user who uses) the mobile terminal 310 being at a location designated by conditions (hereinafter referred to as the "designated location"). The likelihood L in the case of the location event is defined according to the accuracy of the sensing function of the event generation unit 334. The position detection accuracy varies with an effective radius of GPS in the case of using GPS and with an access point of WiFi or the like in the case of using WiFi. Thus, the likelihood L in the case of the location event is defined according to radio field strength (strength of received radio waves). Moreover, the likelihood L changes with movement of (the user who uses) the mobile terminal 310.

Figure 13:
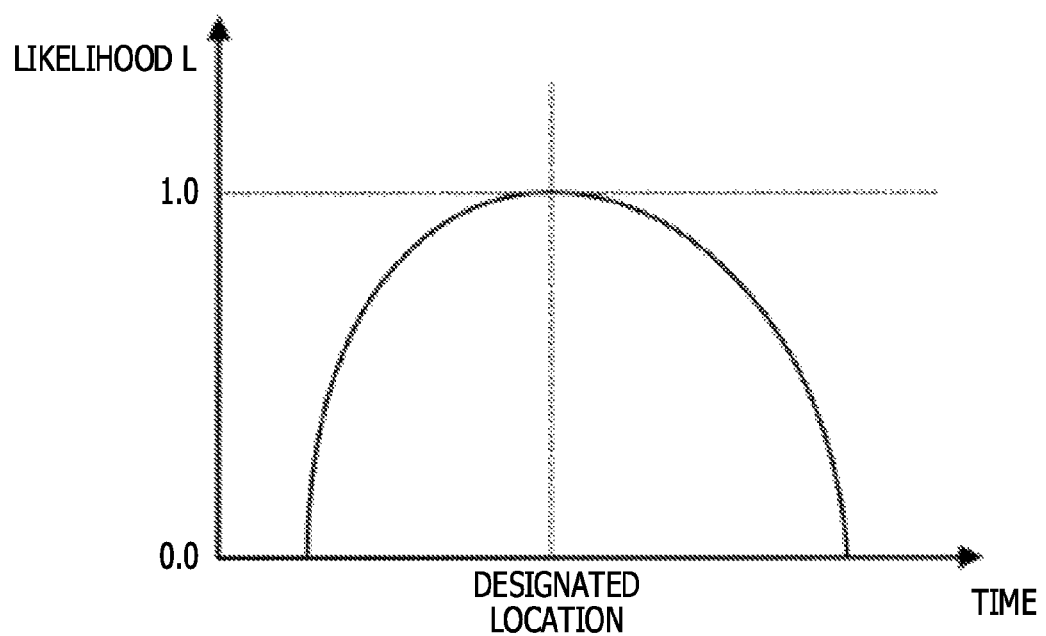
FIG. 13 is a diagram illustrating a specific example of likelihood L that is increased as a mobile terminal approaches a designated location and attenuated as the mobile terminal moves away from the designated location.
Figure 14:
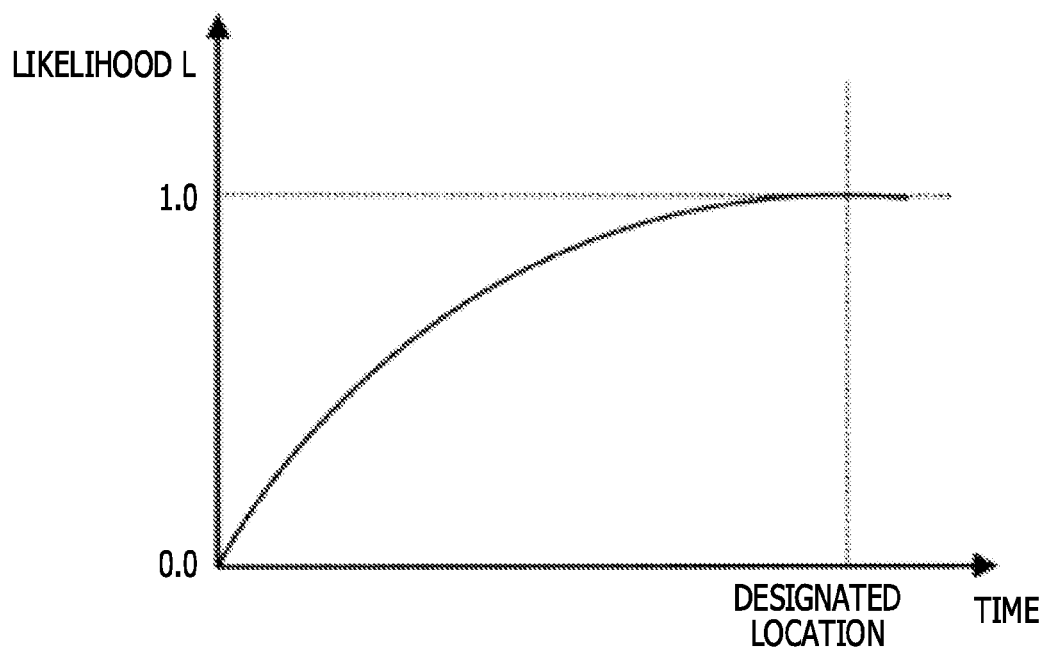
FIG. 14 is a diagram illustrating a specific example of the likelihood L that is increased as the mobile terminal approaches the designated location.
Figure 15:
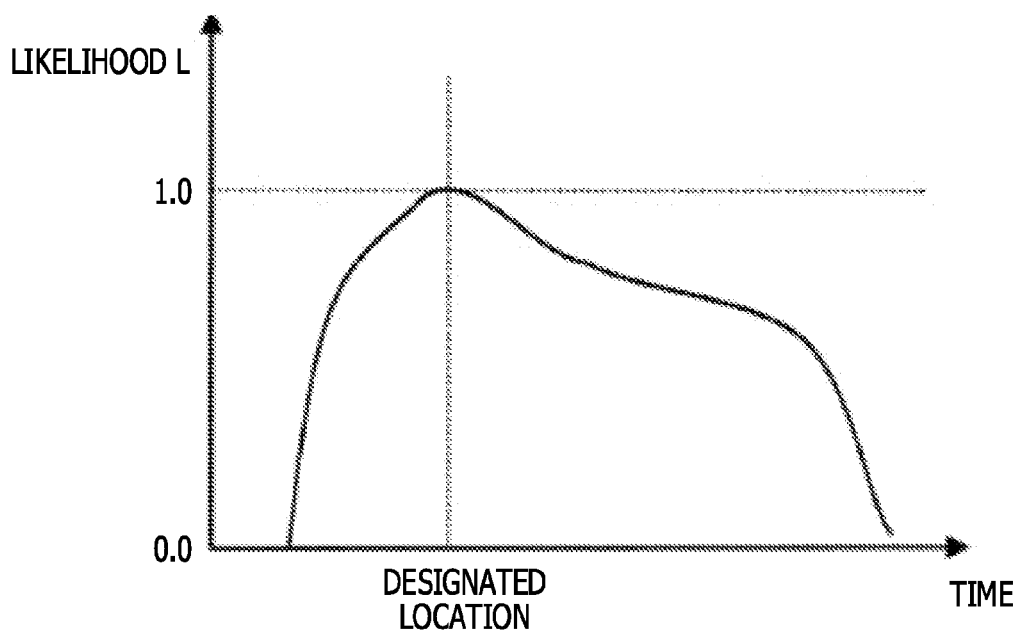
FIG. 15 is a diagram illustrating a specific example of likelihood L that is changed with the movement of the mobile terminal (user)

FIGS. 13 to 15 illustrate specific examples of the likelihood L for the location event. FIG. 13 illustrates a specific example of the likelihood L when (the user who uses) the mobile terminal 310 approaches the designated location and then moves away after reaching the designated location. FIG. 14 illustrates a specific example of the likelihood L when (the user who uses) the mobile terminal 310 is approaching the designated location from a distance. FIG. 15 illustrates a specific example of the likelihood L when (the user who uses) the mobile terminal 310 is moving around the designated location.

Figure 16:
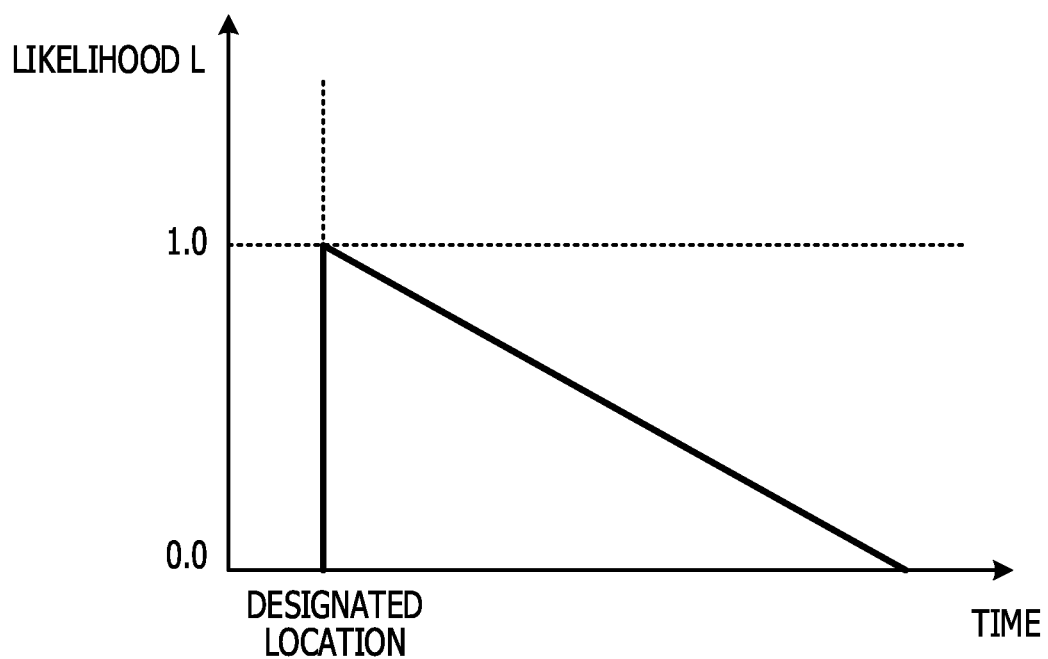
FIG. 16 is a diagram illustrating a specific example of likelihood L that is attenuated according to an elapsed time since a specified time.
Figure 17:
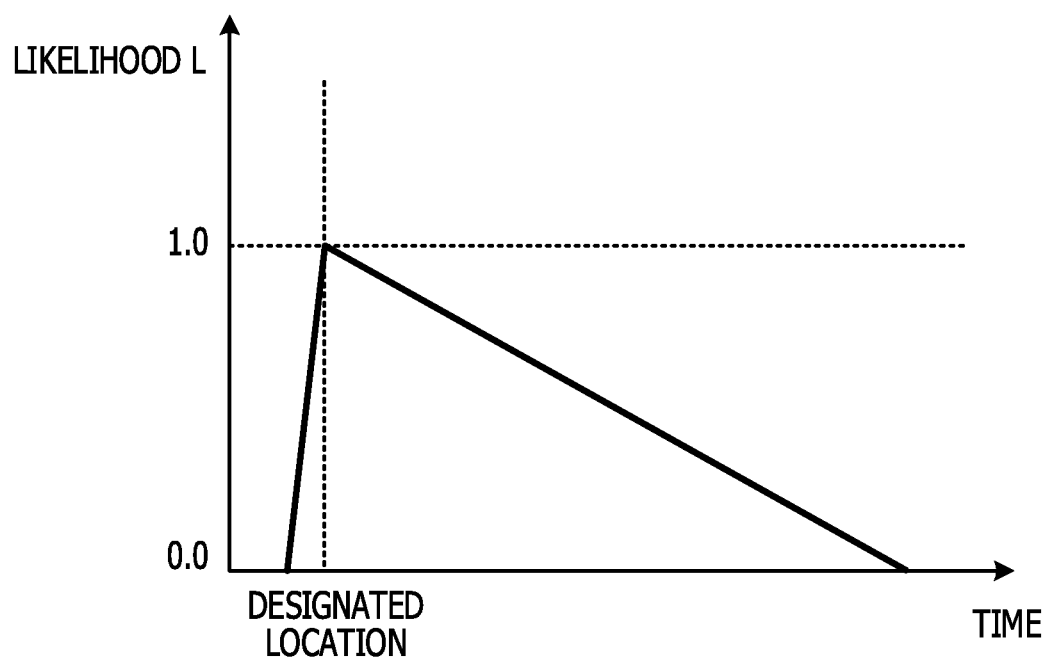
FIG. 17 is a diagram illustrating a specific example of likelihood L that is increased as the time approaches the specified time and attenuated according to the elapsed time since the specified time.
Figure 18:
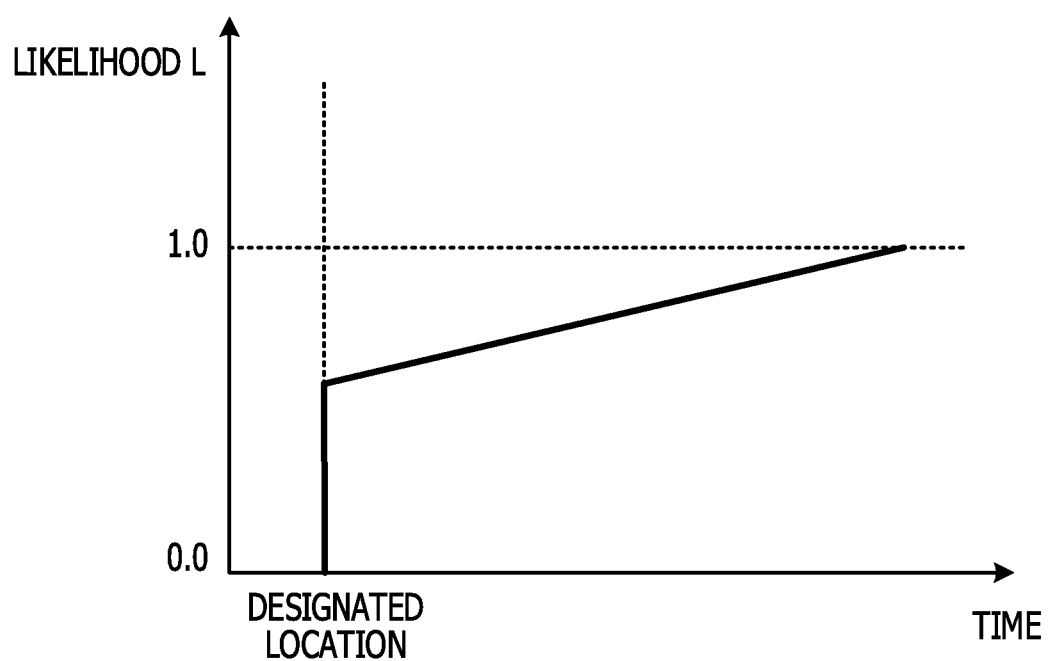
FIG. 18 is a diagram illustrating a specific example of likelihood L that is increased according to the elapsed time since the specified time.
Figure 19:
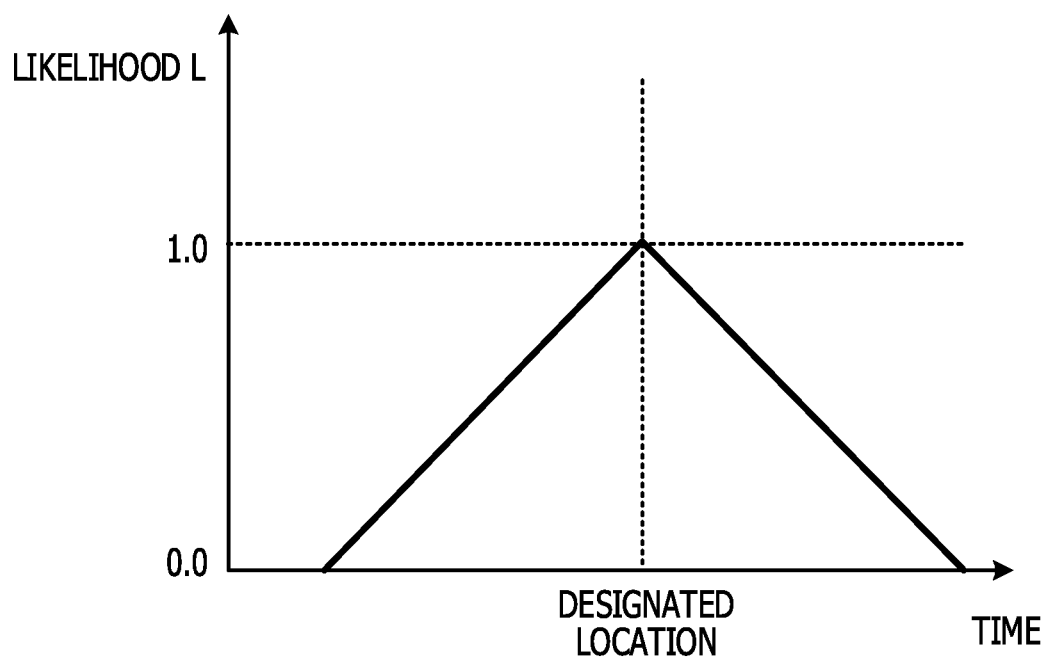
FIG. 19 is a diagram illustrating a specific example of likelihood L that is increased as the time approaches the specified time and attenuated according to the elapsed time since the specified time.

Meanwhile, in the case of a time event such as those generated by the second event generation unit 336, the likelihood L represents a shift in time from a time specified by conditions (hereinafter referred to as the "specified time"). FIGS. 16 to 19 illustrate specific examples of the likelihood L for the time event. FIGS. 16 and 17 illustrate specific examples of the likelihood L that is attenuated with time elapsed from the specified time. FIG. 18 illustrates a specific example of the likelihood L that is increased with time elapsed from the specified time, such as an alarm of an alarm clock, for example. FIG. 19 illustrates a specific example of the likelihood L that is increased with approaching to the specified time and attenuated with time elapsed from the specified time.

Note that the likelihoods L illustrated in FIGS. 13 to 19 are specific examples, and what values are to be taken may be defined beforehand according to the kind of the event, the sensing functions of the first and second event generation units 334 and 336, the kind of the action, and the like.

As illustrated in FIG. 1, the condition determination unit 320 in the mobile terminal 310 according to this embodiment includes a determination section 322, a priority calculation section 324, and a priority comparison section 326.

The determination section 222 determines whether or not an action may be executed by determining conditions based on rules 330, as in the case of the determination section 222 in the second embodiment.

The priority calculation section 324 calculates a current priority Pt as in the case of the priority calculation section 224 in the second embodiment. The priority calculation section 324 further updates the start priority Ps by calculating the likelihood L×the start priority Ps to reflect the likelihood L on the start priority Ps and overwriting the start priority Ps with the likelihood L reflected thereon in the execution waiting rule list 32.

As in the case of the priority comparison section 226 in the second embodiment, the priority comparison section 326 compares the current priority Pt with the highest start priority Ps, and instructs switching of the action 41 in execution when the highest start priority Ps has a larger value.

Next, description is given of an operation performed by the condition determination unit 320 in the mobile terminal 310 according to this embodiment.

Figure 20:
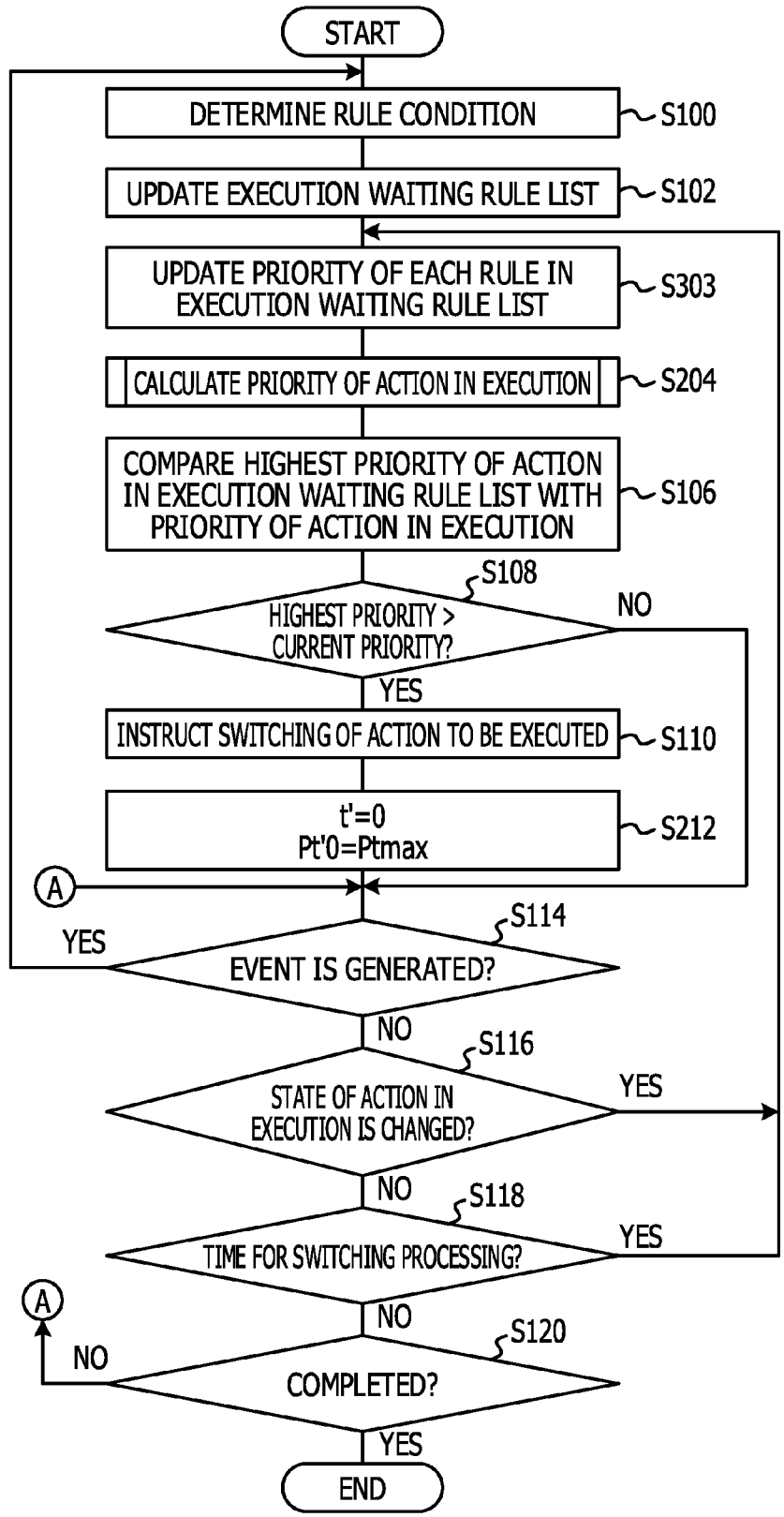
FIG. 20 is a flowchart illustrating an example of switching processing according to a third embodiment.

FIG. 20 is a flowchart illustrating an example of switching processing according to this embodiment. Note that the same processing steps as those in the switching processing according to the second embodiment are denoted by the same reference numerals, and detailed description thereof is omitted.

In Steps S100 and S102, the determination section 322 determines the conditions of the rules 330, and writes the rule 330 with the condition met in the execution waiting rule list 32.

Next, in Step S303, the priority calculation section 324 calculates the likelihood L×the start priority Ps, and updates the start priority Ps in the execution waiting rule list 32 with the calculated value.

Next, in Step S204, the priority calculation section 324 executes priority calculation processing of the action 41 in execution illustrated in FIG. 11. The priority calculation processing is the same as the priority calculation processing described in the second embodiment, and thus description thereof is omitted.

Then, in Step S106, the priority comparison section 326 compares the start priority with the highest value, among the start priorities Ps of the rules 330 written in the execution waiting rule list 32, with the current priority Pt calculated by the processing in Step S104. Here, although the priority comparison section 326 performs the comparison in the same manner as in the embodiments described above, the priority comparison section 326 compares the current priority Pt with the start priority Ps with the likelihood L reflected thereon, since the start priority Ps is updated by the processing of Step S303.

Next, in Steps S108 and S110, the priority comparison section 326 determines whether or not the highest start priority Ps>the current priority Pt is true. When the highest start priority Ps>the current priority Pt is not true, the processing moves to Step S114. On the other hand, when the highest start priority Ps>the current priority Pt, the priority comparison section 326 instructs the action execution management unit 40 to switch the action 41 in execution.

Next, in Step S212, the priority comparison section 326 sets the elapsed time t'=0 and the current priority Pt'0 at the start of the state=the maximum value Ptmax, as in the case of the second embodiment.

Next, in Steps S114 to S120, the condition determination unit 320 determines whether or not an event is generated, the state of the action 41 in execution is changed, it is time to perform the switching processing and termination conditions are met. Thus, the switching processing is repeated or terminated.

Next, description is given of switching of the action 41 in execution by the switching processing according to this embodiment by giving a specific example. Here, as a specific example, the action of the rule 330 (11) illustrated in FIG. 21 corresponds to the action 41 in execution.

Figure 22:
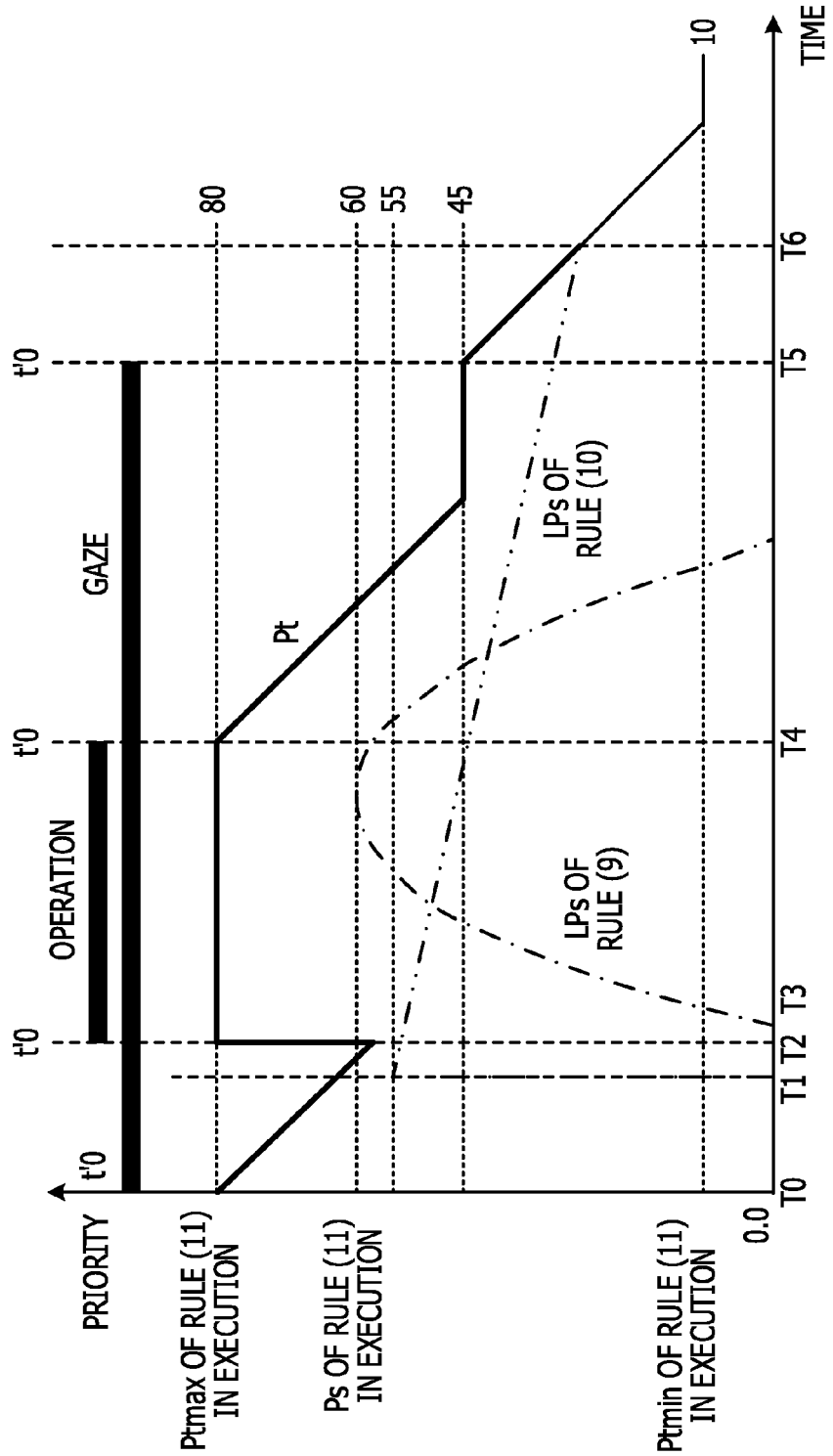
FIG. 22 is a diagram for explaining a change in the current priority Pt of an action in execution according to the third embodiment.

FIG. 22 illustrates a specific example used for description of a change in the current priority Pt of the action 41 in execution. In the rule 330 (11), when the state of the action is "gaze", the minimum value preset for each state of the action is Ptmin+s×(Ptmax−Ptmin)=10+0.5×(80−10)=45. On the other hand, when the state of the action is "operation", the minimum value preset for each state of the action is Ptmin+s×(Ptmax−Ptmin)=10+1.0×(80−10)=80. Meanwhile, when the state of the action is "other", the minimum value preset for each state of the action is Ptmin+s×(Ptmax−Ptmin)=10+0.0×(80−10)=10.

As illustrated in FIG. 22, at the time T0, the current priority Pt of the action 41 in execution=the maximum value Ptmax=80. Although the state of the action 41 in execution is "gaze" at the time T0, the current priority Pt=80>45. Thus, the current priority Pt is gradually attenuated according to the elapsed time t'.

The determination section 322 repeats the determination of the conditions of the rules 330 during the switching processing as described above. FIG. 22 illustrates the case where the condition of the rule 330 (10) is met at the time T1 and written in the execution waiting rule list 32. The start priority Ps, on which the likelihood L of the rule 330 (10) is reflected, changes in the same manner as the likelihood L illustrated in FIG. 16. The rule 330 (10) has the start priority Ps=55, which is not more than the current priority Pt of the action 41 in execution at the time T1. Thus, no switching of the action 41 in execution occurs.

When the state of the action 41 in execution is changed to "operation" at the time T2, the current priority Pt jumps straight to 80 since the minimum value of "operation"=80. During the "operation" state, the current priority Pt stays at 80.

At the time T3, the condition of the rule 330 (9) is met and written in the execution waiting rule list 32. The start priority Ps, on which the likelihood L of the rule 330 (9) is reflected, changes in the same manner as the likelihood L illustrated in FIG. 13. Since the start priority Ps is not more than the current priority Pt of the action 41 in execution at the time T3, no switching of the action 41 in execution occurs.

When the state of the action 41 in execution is changed to "gaze" at the time T4, the current priority Pt starts being attenuated according to the elapsed time t', and then stays unchanged after reaching the minimum value of "gaze"=45.

When the state of the action 41 in execution is changed to "other" at the time T5, the current priority Pt starts being attenuated according to the elapsed time t'. When the current priority Pt<the start priority Ps on which the likelihood L of the rule 330 (10) is satisfied at the time T6, the action 41 in execution is switched to the action of the rule 330 (10).

As described above, in the mobile terminal 310 according to this embodiment, the start priority Ps and the maximum value Ptmax and the minimum value Ptmin of the current priority Pt are associated beforehand for each of the rules 330 which are the ECA rules. Moreover, the priority comparison section 326 switches the action 41 in execution based on a result of comparison between the start priority Ps with the likelihood L reflected thereon and the dynamically changing current priority Pt. Therefore, the same effects as those achieved in the first embodiment are achieved.

Moreover, in this embodiment, the start priority Ps with the likelihood L reflected thereon is compared with the current priority Pt. Thus, switching of the action 41 in execution may be more naturally performed.

Note that, in this embodiment, the likelihood L is reflected on the start priority Ps of the rule 230 as in the second embodiment. However, the likelihood L may be reflected on the start priority Ps of the rule 30 in the first embodiment.

Note that, in this embodiment, the likelihood L is used as the probability of the condition according to the sensing function, the kind of the event, and the like. However, the embodiment is not limited thereto, but any other probability value may be employed.

Fourth Embodiment

Next, a fourth embodiment is described. In this embodiment, description is given of a case where a method for calculating the current priority Pt is different from that in the second embodiment. Note that the same components as those in the mobile terminal 210 according to the second embodiment are denoted by the same reference numerals, and detailed description thereof is omitted.

As illustrated in FIG. 1, a mobile terminal 410 according to the fourth embodiment includes a condition determination unit 420, a first event generation unit 34, a second event generation unit 36, an action execution management unit 40, a screen gaze detection unit 42, and a user operation detection unit 44.

The condition determination unit 420 includes a determination section 422, a priority calculation section 424, and a priority comparison section 426.

The priority calculation section 424 calculates a current priority Pt, but employs a method for calculating the current priority Pt, which is different from that employed in the second embodiment. In the second embodiment, when the state of the action 41 in execution is "other", the current priority Pt is attenuated with the elapsed time t'. On the other hand, in this embodiment, when the state of the action 41 in execution is "other", the current priority Pt drops straight to the minimum value Ptmin.

As in the case of the priority comparison section 226 in the second embodiment, the priority comparison section 426 compares the current priority Pt with the highest start priority Ps, and instructs switching of the action 41 in execution when the highest start priority Ps has a larger value.

Next, description is given of an operation performed by the condition determination unit 420 in the mobile terminal 410 according to this embodiment.

Note that the condition determination unit 420 is different from the condition determination unit 220 in the mobile terminal 210 according to the second embodiment only in priority calculation processing. The other steps of the switching processing are the same as those in the second embodiment, and thus description thereof is omitted.

Figure 23:
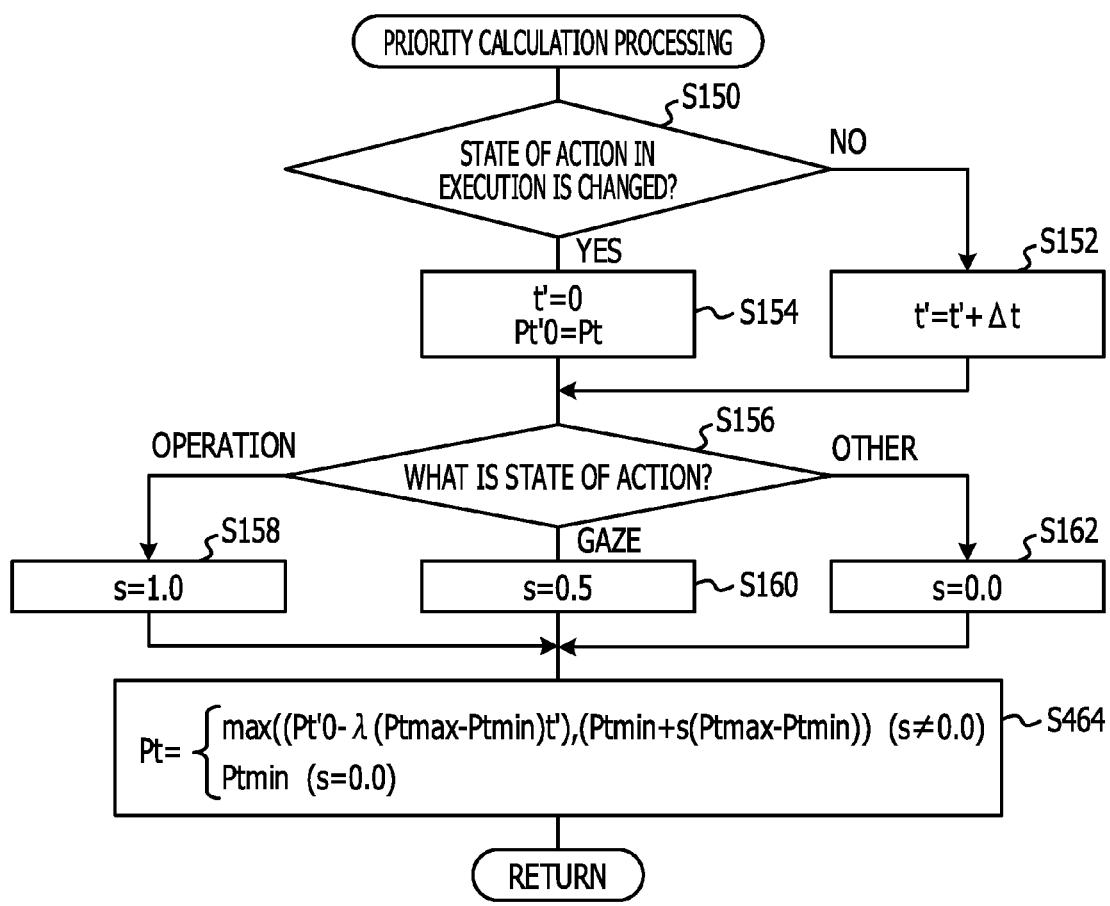
FIG. 23 is a flowchart illustrating an example of priority calculation processing according to a fourth embodiment.

FIG. 23 is a flowchart illustrating an example of the priority calculation processing according to this embodiment. In Steps S150 to S162 of the priority calculation processing illustrated in FIG. 23, the priority calculation section 424 determines whether or not the state of the action 41 in execution is changed, based on the result of the detection by the action execution management unit 40.

When the state of the action 41 in execution is not changed, the priority calculation section 424 updates the elapsed time t' since the start by using Equation (1) described above in the first embodiment. On the other hand, when the state of the action 41 in execution is changed, the priority calculation section 424 sets the elapsed time t'=0 and the current priority Pt'0 at the start of the state=the current priority Pt.

Then, the priority calculation section 424 determines the kind of the state of the action 41 in execution. The state value s=1.0 is acquired when the state of the action 41 in execution is "operation". The state value s=0.5 is acquired when the state is "gaze". The state value s=0.0 is acquired when the state is "other".

Next, in Step S464, the priority calculation section 424 calculates the current priority Pt of the action 41 in execution by calculating Equation (3) described above, as in the case of the second embodiment, when the state value s≠0. On the other hand, when the state value s=0.0, the priority calculation section 424 sets the current priority Pt=the minimum value Ptmin.

Next, description is given of switching of the action 41 in execution by the switching processing according to this embodiment by giving a specific example. Here, as a specific example, the action of the rule 430 (7) illustrated in FIG. 9 corresponds to the action 41 in execution.

Figure 24:
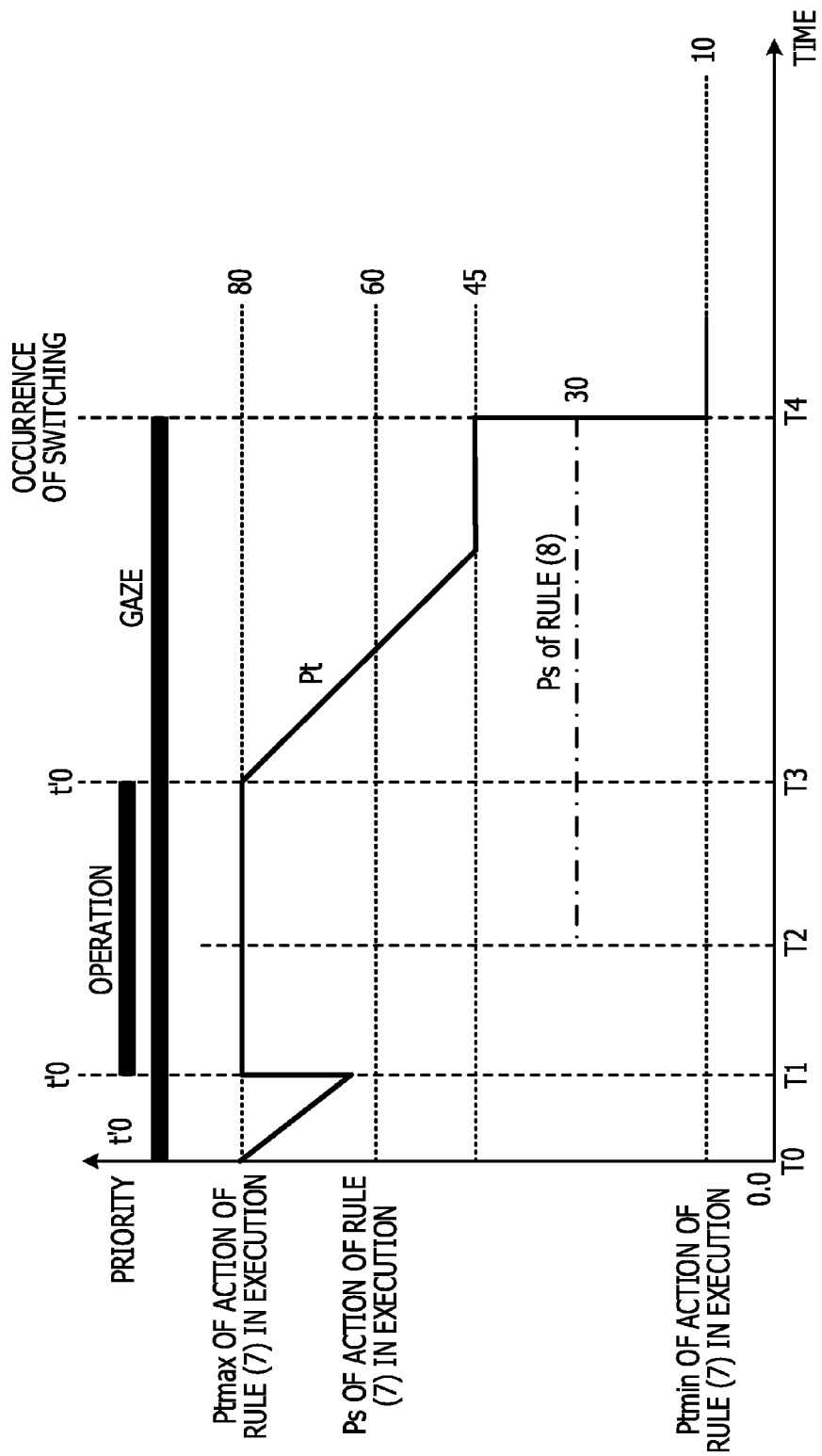
FIG. 24 is a diagram illustrating a specific example of rules used for description of a change in a current priority Pt of an action in execution.

FIG. 24 illustrates a specific example used for description of a change in the current priority Pt of the action 41 in execution. In the rule 430 (7), the minimum value preset for each state of the action is 45 for "gaze", 80 for "operation", and 10 for "other".

As illustrated in FIG. 24, the processing is the same as that in the second embodiment up to the time T4. In this embodiment, when the state of the action 41 in execution is changed to "other" at the time T4, the current priority Pt drops straight to the minimum value Ptmin=10. Since the current priority Pt<the start priority Ps of the rule 430 (8) is satisfied at the time T4, the action 41 in execution is switched to the action of the rule 430 (8).

As described above, in the mobile terminal 410 according to this embodiment, the start priority Ps and the maximum value Ptmax and the minimum value Ptmin of the current priority Pt are associated beforehand for each of the rules 430 which are the ECA rules. The priority calculation section 424 sets the current priority Pt=the minimum value Ptmin when the state of the action 41 in execution is "other". The priority comparison section 426 switches the action 41 in execution based on the result of comparison between the start priority Ps in the execution waiting rule list 32 and the dynamically changing current priority Pt. Therefore, the same effects as those achieved in the first embodiment are achieved.

Moreover, in this embodiment, the current priority Pt=the minimum value Ptmin in the case of "other". Thus, the action 41 in execution may be quickly switched.

As described above, by setting the current priority Pt=the minimum value Ptmin for a state where it is assumed that the user is not using or does not have to use the action 41 in execution, the action 41 in execution is more easily switched to the action of another rule 430.

Note that there is a case where it is assumed that the user suspends "operation" and "gaze" to pay attention to exhibits and his/her surroundings and then starts using the action 41 in execution again. In such a case, the current priority Pt may be attenuated straight down to the minimum value Ptmin as in this embodiment after gradually attenuating the current priority Pt for a certain period of time as in the case of "other" in the first to third embodiments.

Note that the description is given of the case where the current priority Pt=the minimum value Ptmin is set when the state of the action 41 in execution is "other" in the priority calculation processing of the second embodiment. However, the processing may be performed in the same manner also in the first and third embodiments.

Fifth Embodiment

Next, a fifth embodiment is described. In this embodiment, concrete description is given by giving a comparative example of an operation performed by a condition determination unit 520 in a mobile terminal 510 obtained by combining the third and fourth embodiments. Note that configurations and operations of the mobile terminal 510 and the condition determination unit 520 correspond to the case where the third and fourth embodiments are combined, and thus description thereof is omitted. The following description is given of only a specific example of switching the action 41 in execution by switching processing.

FIG. 25 illustrates a specific example of rules 530 according to this embodiment. As the specific example of this embodiment, an action of the rule 530 (14) illustrated in FIG. 25 corresponds to the action 41 in execution. Moreover, in this embodiment, it is assumed, as a specific example, that location a and location b partially overlap and (a user who uses) the mobile terminal 510 moves from location b to location a.

Figure 26:
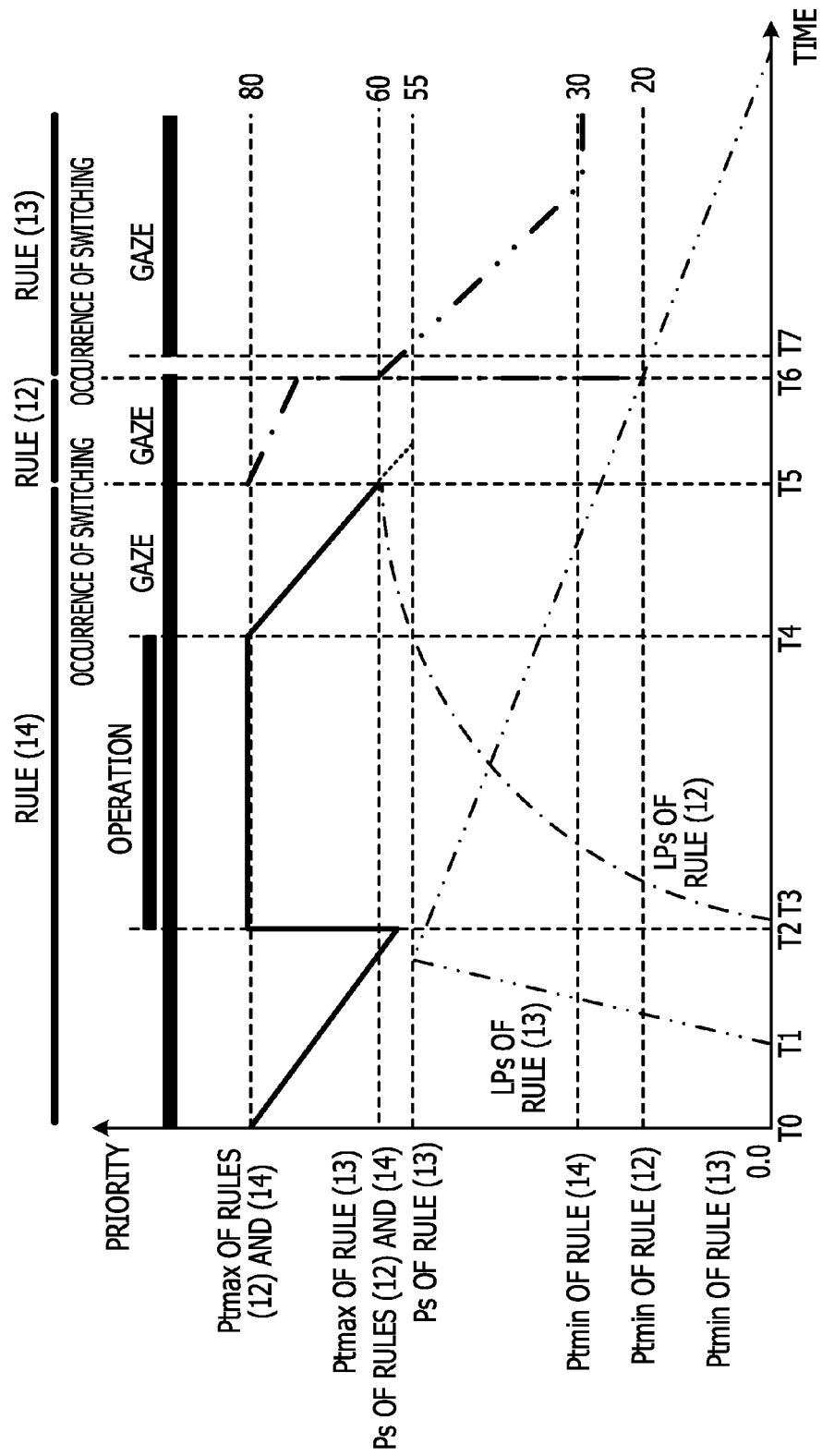
FIG. 26 is a diagram used for explaining a specific example of switching of an action in execution according to the fifth embodiment.

FIG. 26 illustrates a specific example used for description of switching of the action 41 in execution. In the rule 530 (14), when the state of the action is "gaze", the minimum value preset for each state of the action is 30+0.5×(80−30) =55. On the other hand, when the state of the action is "operation", the minimum value preset for each state of the action is 30+1.0×(80−30)=80. Meanwhile, when the state of the action is "other", the minimum value preset for each state of the action is the minimum value Ptmin=30.

As illustrated in FIG. 26, at the time T0, the condition of the rule 530 (14) is met, and execution of an introduction app for location b, that is, an app 3 is started. At the time T0, the current priority Pt of the action 41 in execution=the maximum value Ptmax=80. Although the state of the action 41 in execution is "gaze" at the time T0, the current priority Pt starts being attenuated with the elapsed time t' since the current priority Pt=80>55.

As described above, since the determination of the conditions of the rules 530 is repeated during the switching processing, the condition of the rule 530 (13) is met at the time T1 and written into the execution waiting rule list 32. The rule 530 (13) is a time event, which changes in the same manner as the likelihood L illustrated in FIG. 17. Also, the rule 530 (13) has the start priority Ps=55, which is not more than the current priority Pt of the action 41 in execution at the time T1. Thus, no switching of the action 41 in execution occurs.

When the state of the action 41 in execution is changed to "operation" at the time T2, the current priority Pt jumps straight to 80 since the minimum value of "operation"=80. During the "operation" state, the current priority Pt stays at 80.

At the time T3, the condition of the rule 530 (12) is met and written into the execution waiting rule list 32. The rule 530 (12) is a location event. The start priority Ps, on which the likelihood L of the rule 530 (12) is reflected, changes in the same manner as the likelihood L illustrated in FIG. 14. Since the start priority Ps is not more than the current priority Pt of the action 41 in execution at the time T3, no switching of the action 41 in execution occurs.

When the state of the action 41 in execution is changed to "gaze" at the time T4, the current priority Pt starts being attenuated according to the elapsed time t'.

When the current priority Pt<the start priority Ps on which the likelihood L of the rule 530 (12) is reflected is satisfied, the action 41 in execution is switched to the action of the rule 530 (12). Thus, the introduction app for location b is terminated, and execution of an introduction app for location a, that is an app 1 of (12) is started. In the rule 530 (12), when the state of the action is "gaze", the minimum value preset for each state of the action is 20+0.5×(80−20)=50. On the other hand, when the state of the action is "operation", the minimum value preset for each state of the action is 20+1.0×(80−20)=80. Meanwhile, when the state of the action is "other", the minimum value preset for each state of the action is the minimum value Ptmin=20.

At the time T5, as the action 41 in execution is switched, the current priority Pt of the action 41 in execution jumps straight to the maximum value Ptmax=80.

Although the state of the action 41 in execution stays as "gaze" at the time T5, the current priority Pt starts being attenuated with the elapsed time t' since the current priority Pt=80>40.

When the user stops gazing and the state of the action 41 in execution is changed to "other" at the time T6, the current priority Pt drops straight to the minimum value Ptmin.

Accordingly, at the time T6, the current priority Pt<the start priority Ps on which the likelihood L of the rule 530 (13) is satisfied. Thus, the action 41 in execution is switched to the action of the rule 530 (13). Therefore, the introduction app for location a is terminated, and execution of a time sale app, that is an app 2 of (13) is started. In the rule 530 (13), when the state of the action is "gaze", the minimum value preset for each state of the action is 0+0.5×(60−0)=30. On the other hand, when the state of the action is "operation", the minimum value preset for each state of the action is 0+1.0× (60−0)=60. Meanwhile, when the state of the action is "other", the minimum value preset for each state of the action is the minimum value Ptmin=0.

At the time T6, as the action 41 in execution is switched, the current priority Pt of the action 41 in execution jumps straight to the maximum value Ptmax=60.

At the time T7, the start of the new app 2 causes the user to gaze at the mobile terminal 510 again. Thus, the state of the action 41 in execution is changed to "gaze". Accordingly, the current priority Pt starts being attenuated with the elapsed time t' toward the minimum value in the case where the state of the action 41 in execution is "gaze".

Meanwhile, as a comparative example, description is given of a case where, although the start priority Ps is associated with the ECA rules, the current priority Pt stays the same as the start priority Ps, and the maximum value Ptmax and the minimum value Ptmin are not associated. Moreover, in the comparative example, the action in execution is switched when the current priority Pt≤the start priority Ps.

FIG. 27 illustrates a specific example of the ECA rules in the comparative example. The ECA rules illustrated in FIG. 27 are different from the rules 530 (see FIG. 25) in the above embodiments in that the maximum value Ptmax and the minimum value Ptmin are not associated. The action of the ECA rule (Comparison 3) illustrated in FIG. 27 corresponds to the action in execution.

Figure 28:
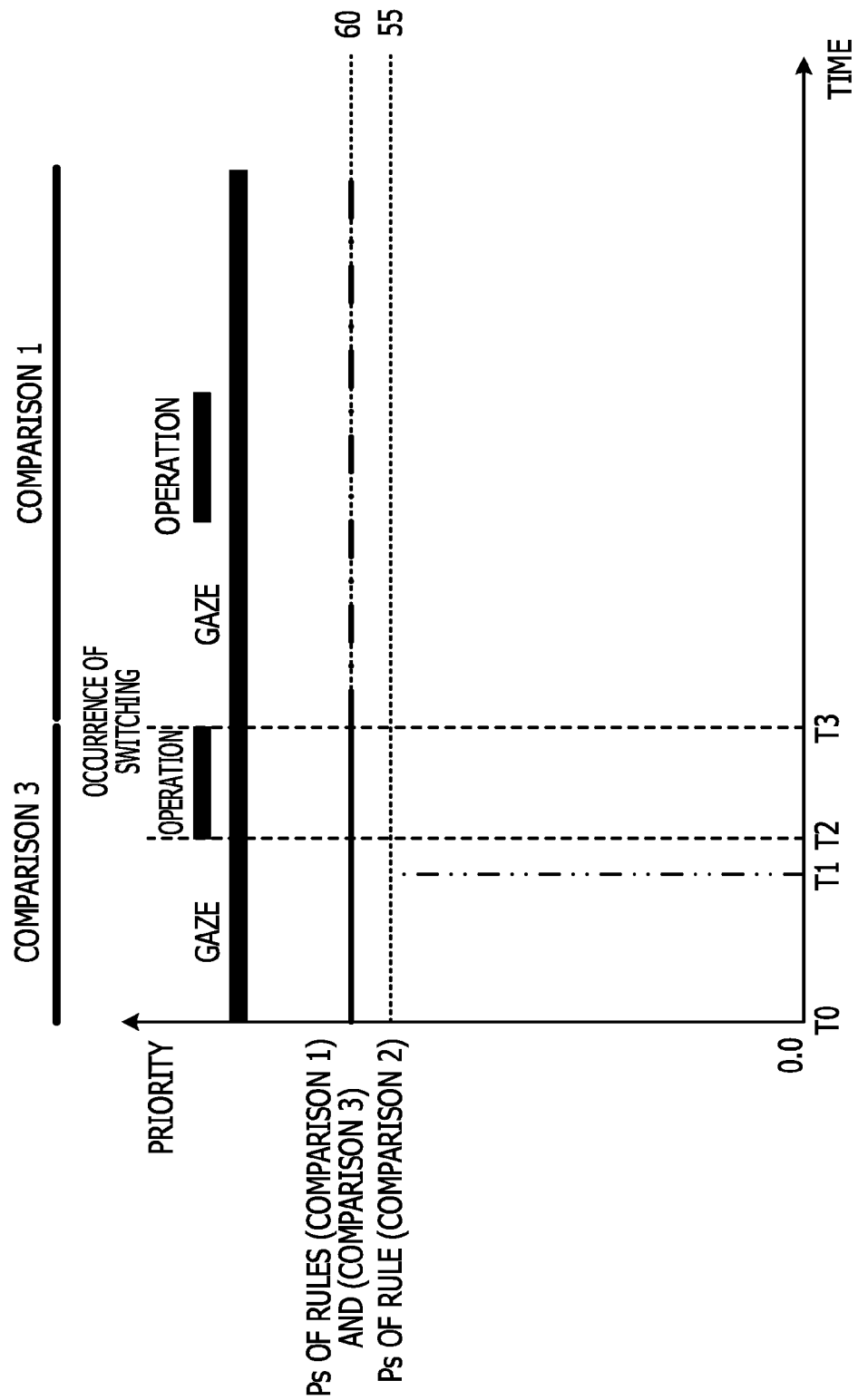
FIG. 28 is a diagram used for explaining a specific example of switching of an action in execution according to the mobile terminal of the comparative example.

FIG. 28 illustrates a specific example used to explain switching of the action 41 in execution.

As illustrated in FIG. 28, at the time T0, the condition of the ECA rule (Comparison 3) is met, and execution of an introduction app for location b, that is an app 3, is started. At the time T0, the current priority Pt of the action in execution is the start priority Ps=60.

In the mobile terminal of the comparative example, again, the determination of the conditions of the ECA rules illustrated in FIG. 27 is repeated. Thus, although the condition of the ECA rule (Comparison 2) is met at the time T1, no switching of the action in execution occurs since the start priority Ps=55<the current priority Pt=60. As described above, since the start priority Ps of the ECA rule (Comparison 2) is smaller than the start priorities Ps of the other two ECA rules, switching does not occur during execution of the other ECA rules.

Moreover, even when the state of the action 41 in execution is changed to "operation" at the time T2, the current priority Pt of the action in execution is not changed.

At the time T3, since the condition of the ECA rule (Comparison 1) is met and the start priority Ps=60=the current priority Pt=60, the action in execution is switched. Thus, the introduction app for location b is terminated even during the user operation, and execution of an introduction app for location a, that is an app 1 of (Comparison 1), is started.

As described above, in the mobile terminal 510 according to this embodiment, the current priority Pt of the action 41 in execution changes with the state of the action and the elapsed time t' since the start of the state. Thus, switching of the action 41 in execution may be reduced. As a result, compared with the mobile terminal of the comparative example, switching of the action 41 in execution during use by the user (during operation and use) may be reduced.

Moreover, in the mobile terminal 510 according to this embodiment, even when events are generated in series and there are the rules 530 with the conditions met, continuous switching of the action 41 in execution may be reduced. Thus, the user may be provided with time to watch.

Figure 29:
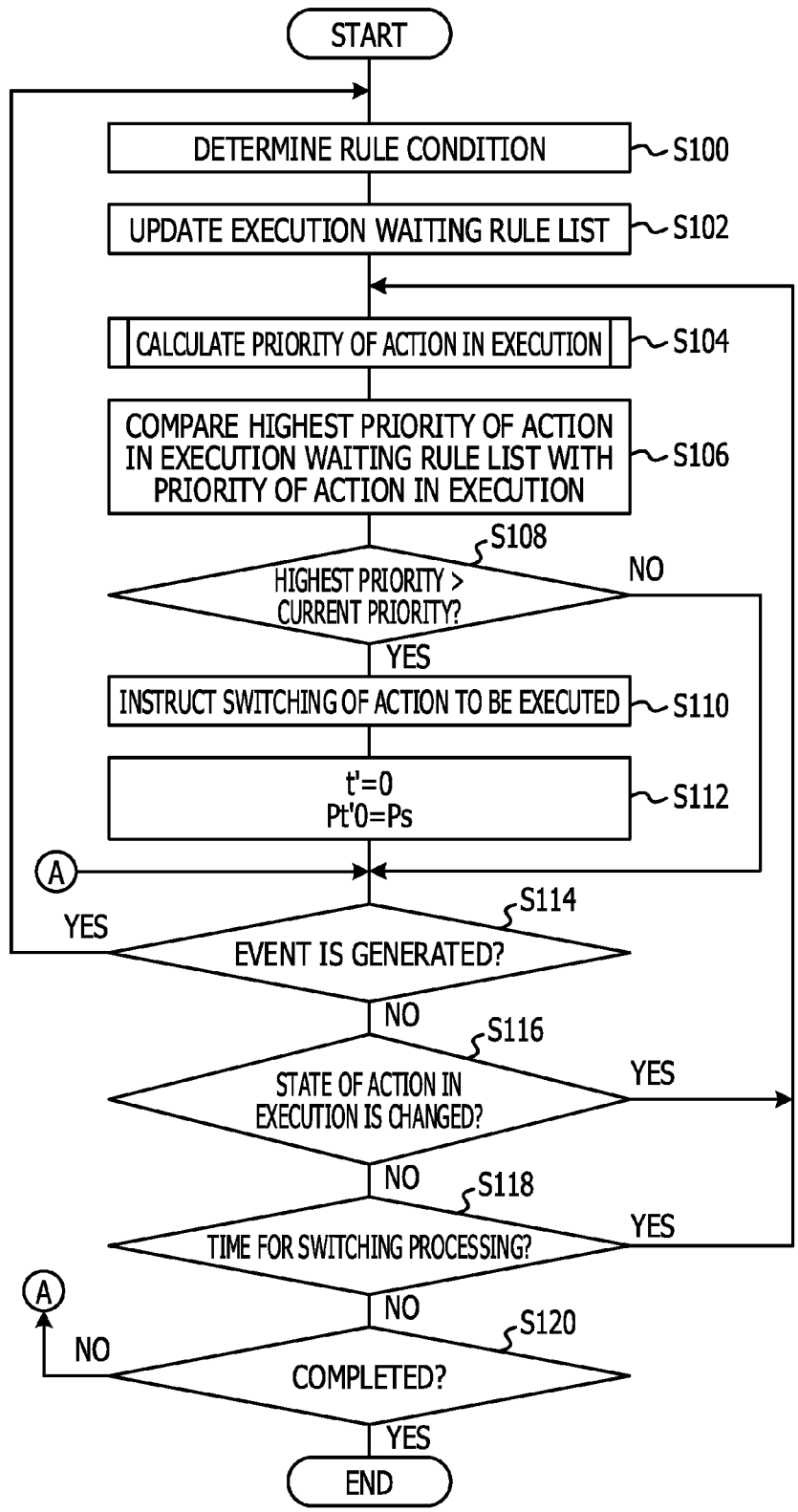
FIG. 29 is a flowchart for explaining a modified example of the switching processing according to the first embodiment.

Note that, in the above embodiments, the description is given of the case where the action 41 in execution is switched when the highest start priority Ps>the current priority Pt. However, the embodiments are not limited thereto, but the switching may be performed when the highest start priority Ps≥the current priority Pt. As a specific example, FIG. 29 illustrates a flowchart of an example of a case where the action 41 in execution is switched when the highest start priority Ps≥the current priority Pt in the switching processing of the first embodiment. As illustrated in FIG. 29, the same processing may be performed except that Step S608 is performed instead of Step S108 in the switching processing (see FIG. 5) in the first embodiment.

Moreover, in the switching processing according to the above embodiments, the current priority Pt at the start may be maintained for a certain period of time, in order to further reduce switching immediately after switching of the action 41 in execution. Particularly, in the fourth and fifth embodiments, the current priority Pt at the start may be maintained for a certain period of time, in order to reduce switching immediately after switching of the action 41 in execution even when the state of the action stays as "other". Furthermore, in the third and fifth embodiments, for the same reason, the current priority Pt may be calculated by Equation (2) for a certain period of time.

Moreover, in the above embodiments, the description is given of the case where the information processing device is applied to the mobile terminal as the specific example. However, the embodiments are not limited thereto, but the information processing device may be applied to a desktop computer or the like, for example. Also, the information processing device may be one including no screen.

Moreover, in the above embodiments, the description is given of the action when display is performed on the display unit 66 in the mobile terminal. However, the action is not limited thereto. Also, the states of the action are not limited to those in the above embodiments. For example, the action may be an action providing voice guide.

Moreover, in the above embodiments, the description is given of the mode where the switching program 70 is pre-stored (installed) in the storage unit 56. However, the switching program 70 may be provided as being recorded in a storage medium. Examples of the storage medium include a compact disc read only memory (CD-ROM), a digital versatile disk read only memory (DVD-ROM), a Universal Serial Bus (USB), and the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device comprising:
a processor; and
a memory which stores a plurality of instructions, which when executed by the processor, cause the processor to execute:
determining whether or not an action is executable based on a condition of a rule associated with the condition, the action, and a start priority;
detecting a state of user utilization for an action in execution;
acquiring a state value corresponding to the state of user utilization which indicates an easiness degree of switching to another action from the action in execution during the state of user utilization;
obtaining a first current priority of the action in execution by multiplying the start priority of the action in execution and the state value;
calculating a second current priority of the action in execution based on an elapsed time since start of the state;
selecting, as a current priority of the action in execution, a larger one from the first current priority and the second current priority;
comparing the current priority with the start priority of the rule associated with the action determined to be executable; and
issuing an instruction to switch the action in execution to the action of the rule associated with the start priority, based on the comparison result.

2. The device according to claim 1,
wherein a maximum value and a minimum value of the current priority are defined beforehand.

3. The device according to claim 1,
wherein an event is further associated with the rule,
wherein the determining is performed when the event is generated, and
wherein a new start priority obtained by reflecting likelihood defined according to a kind of the event on the start priority is used in the comparing.

4. The device according to claim 1,
wherein a minimum value of the first current priority is set for each kind of the state of the action.

5. The device according to claim 1,
wherein the current priority is attenuated according to the elapsed time since the start of the state of the action in execution.

6. The device according to claim 1,
wherein, when the start priority is higher than the current priority or when the start priority is not less than the current priority, the processor instructs switching of the action in execution to the action of the rule associated with the start priority.

7. The device according to claim 1,
wherein the state of user utilization includes a state of gazing the action in execution and a state of operating the action in execution.

8. An action switching method, comprising:
determining whether or not an action is executable based on a condition of a rule associated with the condition, the action, and a start priority;
detecting a state of user utilization for an action in execution;
acquiring a state value corresponding to the state of user utilization which indicates an easiness degree of switching to another action from the action in execution during the state of user utilization;
obtaining a first current priority of the action in execution by multiplying the start priority of the action in execution and the state value;
calculating a second current priority of the action in execution based on an elapsed time since start of the state;
selecting, as a current priority of the action in execution, a larger one from the first current priority and the second current priority;
comparing, by a computer processor, the current priority with the start priority of the rule associated with the action determined to be executable; and
issuing an instruction to switch the action in execution to the action of the rule associated with the start priority, based on the comparison result.

9. The method according to claim 8,
wherein a maximum value and a minimum value of the current priority are defined beforehand.

10. The method according to claim 8,
wherein an event is further associated with the rule, wherein the determining is performed when the event is generated, and wherein a new start priority obtained by reflecting likelihood defined according to a kind of the event on the start priority is used in the comparing.

11. The method according to claim 8, wherein a minimum value of the first current priority is set for each kind of the state of the action.

12. The method according to claim 8, wherein the current priority is attenuated according to the elapsed time since the start of the state of the action in execution.

13. The method according to claim 8, wherein, when the start priority is higher than the current priority or when the start priority is not less than the current priority, the computer processor instructs switching of the action in execution to the action of the rule associated with the start priority.

14. The method according to claim 8, wherein the state of user utilization includes a state of gazing the action in execution and a state of operating the action in execution.

15. A non-transitory recording medium storing a switching program to be executed by a computer, the computer executing, based on the switching program, operations of:

determining whether or not an action is executable based on a condition of a rule associated with the condition, the action, and a start priority;

detecting a state of user utilization for an action in execution;

acquiring a state value corresponding to the state of user utilization which indicates an easiness degree of switching to another action from the action in execution during the state of user utilization;

obtaining a first current priority of the action in execution by multiplying the start priority of the action in execution and the state value;

calculating a second current priority of the action in execution based on an elapsed time since start of the state;

selecting, as a current priority of the action in execution, a larger one from the first current priority and the second current priority;

comparing the current priority with the start priority of the rule associated with the action determined to be executable; and issuing an instruction to switch the action in execution to the action of the rule associated with the start priority, based on the comparison result.

16. The device according to claim 1, wherein, when detecting two or more kinds of the state for the action in execution, the kind of state having a largest state value is used in the calculating the first current priority.

17. The method according to claim 8, wherein, when detecting two or more kinds of the state for the action in execution, the kind of state having a largest state value is used in the calculating the first current priority.

18. The non-transitory recording medium according to claim 15, wherein, when detecting two or more kinds of the state for the action in execution, the kind of state having a largest state value is used in the calculating the first current priority.

19. The non-transitory recording medium according to claim 15, wherein the state of user utilization includes a state of gazing the action in execution and a state of operating the action in execution.

20. The device according to claim 1, wherein, the processor, when determining a plurality of actions as the action determined to be executable, compares the current priority with the start priority of the action of the plurality of actions which has the highest start priority.

* * * * *